(12) United States Patent
Yamauchi et al.

(10) Patent No.: US 12,162,439 B2
(45) Date of Patent: Dec. 10, 2024

(54) CLEANING SYSTEM FOR VEHICLES AND CLEANING METHOD FOR SAME

(71) Applicant: DENSO CORPORATION, Kariya (JP)

(72) Inventors: Yuusuke Yamauchi, Kariya (JP); Shouta Adachi, Kariya (JP); Takahiro Aoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 761 days.

(21) Appl. No.: 17/282,486

(22) PCT Filed: Nov. 20, 2019

(86) PCT No.: PCT/JP2019/045496
§ 371 (c)(1),
(2) Date: Apr. 2, 2021

(87) PCT Pub. No.: WO2020/105686
PCT Pub. Date: May 28, 2020

(65) Prior Publication Data
US 2021/0380075 A1  Dec. 9, 2021

(30) Foreign Application Priority Data

Nov. 21, 2018 (JP) .................... 2018-218595
Mar. 29, 2019 (JP) .................... 2019-065882
Sep. 10, 2019 (JP) .................... 2019-164816

(51) Int. Cl.
*B60S 1/48* (2006.01)
*B05B 12/06* (2006.01)
*B60S 1/52* (2006.01)

(52) U.S. Cl.
CPC .............. *B60S 1/481* (2013.01); *B05B 12/06* (2013.01); *B60S 1/52* (2013.01)

(58) Field of Classification Search
None
See application file for complete search history.

(56) References Cited

U.S. PATENT DOCUMENTS

2016/0339875 A1   11/2016  Ina et al.
2018/0015908 A1*   1/2018  Rice .................... B60S 1/56
(Continued)

FOREIGN PATENT DOCUMENTS

JP    2009166473    *  7/2009 ............ B05C 11/10
JP    2018-037100 A    3/2018

OTHER PUBLICATIONS

JP2009166473 English translation, accessed on Apr. 2024. (Year: 2009).*

(Continued)

*Primary Examiner* — Eric W Golightly
*Assistant Examiner* — Arlyn I Rivera-Cordero
(74) *Attorney, Agent, or Firm* — Oliff PLC

(57) ABSTRACT

A vehicle cleaning system includes a drive pump, an ejection nozzle and a valve device. The valve device includes an intake passage, a valve that closes the intake passage and accumulates pressure of the fluid supplied to the intake passage, a discharge passage, and an auxiliary mechanism. The auxiliary mechanism generates leakage of the fluid from the intake passage during the pressure accumulation to accumulate pressure with the leakage at a leaked side, opens the valve body based on two pressures accumulated in the intake passage and the leaked side, outputs the fluid, which is pressure-accumulated in the intake passage, to the discharge passage by opening the valve body, and closes the valve body as the fluid is output to the discharge passage to allow for re-accumulation of the pressure in the intake passage.

18 Claims, 20 Drawing Sheets

(56) References Cited

U.S. PATENT DOCUMENTS

2019/0031155 A1\* 1/2019 Mizuno ................... B08B 3/08
2019/0270432 A1 9/2019 Ina

OTHER PUBLICATIONS

Feb. 4, 2020 International Search Report issued in International Patent Application No. PCT/JP2019/045496, 3 Pages.

\* cited by examiner

CLEANING SYSTEM FOR VEHICLES AND CLEANING METHOD FOR SAME

CROSS-REFERENCE TO RELATED APPLICATIONS

This application is a national stage entry of PCT/JP2019/045496, filed on Nov. 20, 2019, which is based upon and claims the benefit of priority from prior Japanese Patent Application No. 2018-218595, filed on Nov. 21, 2018, Japanese Patent Application No. 2019-65882, filed on Mar. 29, 2019, and Japanese Patent Application No. 2019-164816, filed on Sep. 10, 2019, the entire contents of which are incorporated herein by reference.

TECHNICAL FIELD

The present disclosure relates to a system and method for cleaning a vehicle that sprays fluid against a cleaned subject of a vehicle to remove foreign matter.

BACKGROUND ART

The progress in highly sophisticated vehicle driving assistance and autonomous driving technology has resulted in an increase in the number of sensors used to check vehicle surroundings (refer to, for example, patent document 1). A known example of such a sensor is Light Detection and Ranging or Laser Imaging Detection and Ranging (LIDAR) that is a distance measurement system using an optical sensor. In this distance measurement system, distance is measured with light transmitted and received between a vehicle and an object.

A sensor that checks the vehicle surroundings includes a sensing surface (e.g., outer surface of lens, cover glass, or the like) that is exposed to the outside from the vehicle. Thus, when foreign matter such as raindrops collect on the sensing surface of the sensor, the foreign matter may be in the optical path of the optical sensor thereby adversely affecting the distance measurement accuracy.

Studies have been conducted to clean off foreign matter from the sensing surface by spraying air or a cleaning liquid against the sensing surface of the sensor or by spraying a gas-liquid mixture fluid that is a mixture of air and a cleaning fluid against the sensing surface (refer to, for example, patent document 2).

PRIOR ART DOCUMENTS

Patent Documents

Patent Document 1: Japanese Laid-Open Patent Publication No. 2018-37100
Patent Document 2: Japanese Laid-Open Patent Publication No. 2016-222074

SUMMARY OF THE INVENTION

Problems that the Invention is to Solve

To further ensure that foreign matter is cleaned off from the sensing surface of a sensor, the use of a large drive pump will increase the force of the fluid sprayed against the sensing surface. However, the use of such a drive pump in a vehicle will increase the space occupied by the drive pump and the power used to drive the drive pump. The use of a compact drive pump will result in the need to conduct studies on how to maintain or increase the cleaning capability for removing foreign matter or the like.

In addition to maintaining the cleaning capability as described above, studies have been conducted to find if the spraying of fluid against a cleaned subject, or an output mode of the fluid, can be easily changed in accordance with the cleaned subject.

It is an objective of the present disclosure to provide a system and method for cleaning a vehicle that further increases the cleaning capability for removing foreign matter or the like from a cleaned subject of the vehicle.

Means for Solving the Problems

To achieve the above objective, a vehicle cleaning system (20) according to a first aspect of the present disclosure removes foreign matter from a cleaned subject (11, 12, 15, 16, 17, 18, 67, 68) of a vehicle (10). The vehicle cleaning system (20) includes a drive pump (23), an ejection nozzle (25) that sprays fluid (CA1) supplied from the drive pump (23) against the cleaned subject, and a valve device (24, 24*a*) located between the drive pump and the ejection nozzle. The valve device includes an intake passage (38) positioned in the valve device at a portion located toward the drive pump to draw in the fluid, a valve (30*a*) including a valve body (33*a*) configured to close the intake passage (38), the valve being configured to accumulate pressure so that pressure of the fluid supplied to the intake passage (38) from the drive pump becomes higher than a discharge pressure (P0) of the drive pump, a discharge passage (39) positioned in the valve device at a portion located toward the ejection nozzle, and an auxiliary mechanism (30*a*, 30*b*, 33, 36). The auxiliary mechanism is configured to generate leakage (CAx) of the fluid from the intake passage during the pressure accumulation to accumulate pressure with the leakage at a leaked side, open the valve body based on two pressures (P1, P2) accumulated in the intake passage and the leaked side, output the fluid, which is pressure-accumulated in the intake passage, to the discharge passage (39) by opening the valve body, and close the valve body as the fluid is output to the discharge passage to allow for re-accumulation of the pressure in the intake passage.

In the above description, "the discharge pressure of the drive pump" refers to the pressure in a connection hose when the drive pump and the ejection nozzle are directly connected with the connection hole and the drive pump is driven. The same applies to the description hereafter.

A vehicle cleaning system (20) in accordance with a second aspect of the present disclosure removes foreign matter from a cleaned subject (11, 12, 15, 16, 17, 18, 67, 68) of a vehicle (10). The vehicle cleaning system (20) includes a drive pump (23), an ejection nozzle (25) that sprays fluid (CA1) supplied from the drive pump against the cleaned subject, and a valve device (24, 24*a*) located between the drive pump and the ejection nozzle. The valve device includes an intake passage (38) of the fluid positioned in the valve device at a portion located toward the drive pump, a diaphragm (33) including a valve body (33*a*) that opens and closes the intake passage (38), an urging member (34) that urges the valve body in a direction closing the intake passage, and a discharge passage (39) positioned in the valve device and located toward the ejection nozzle. The diaphragm includes a first pressurized section (33*a*1) having a first area (S1) and pressurized by the fluid supplied from the drive pump in a state in which the intake passage is closed, and a second pressurized section (33*c*1) located around the valve body and having a second area (S2), the second pressurized section being pressurized at a leaked side by the fluid (CAx) leaked from the intake passage in a state in which the intake passage is closed. The diaphragm is configured to open against an urging force of the urging member when the first and second pressurized sections are pressurized and close when the fluid is output to the discharge passage (39) as a result of the opening.

A cleaning method of a vehicle cleaning system (20) in accordance with a third aspect of the present disclosure removes foreign matter from a cleaned subject (11, 12, 15, 16, 17, 18, 67, 68) of a vehicle (10). The vehicle cleaning system (20) includes a drive pump (23), an ejection nozzle (25) that sprays fluid (CA1) supplied from the drive pump (23) against the cleaned subject, and a valve device (24, 24a) located between the drive pump and the ejection nozzle. The valve device includes an intake passage (38) positioned in the valve device at a portion located toward the drive pump to draw in the fluid, a valve body (33a) configured to close the intake passage (38), and a discharge passage (39) positioned in the valve device at a portion located toward the ejection nozzle. The cleaning method includes accumulating pressure so that pressure of the fluid supplied from the drive pump becomes higher than a discharge pressure (P0) of the drive pump, generating leakage (CAx) of the fluid from the intake passage during the pressure accumulation to accumulate pressure at a leaked side, opening the valve body based on two pressures (P1, P2) accumulated in the intake passage and the leaked side, outputting the fluid, which is pressure-accumulated in the intake passage, to the discharge passage (39) by opening the valve body, and closing the valve body as the fluid is output to the discharge passage to allow for re-accumulation of the pressure in the intake passage.

BRIEF DESCRIPTION OF THE DRAWINGS

The present disclosure, together with objects and advantages thereof, may best be understood by reference to the following description of the presently preferred embodiments together with the accompanying drawings in which.

MODES FOR CARRYING OUT THE INVENTION

First Embodiment

A first embodiment of a system and method for cleaning a vehicle in accordance with a first embodiment will now be described.

Figure 1:
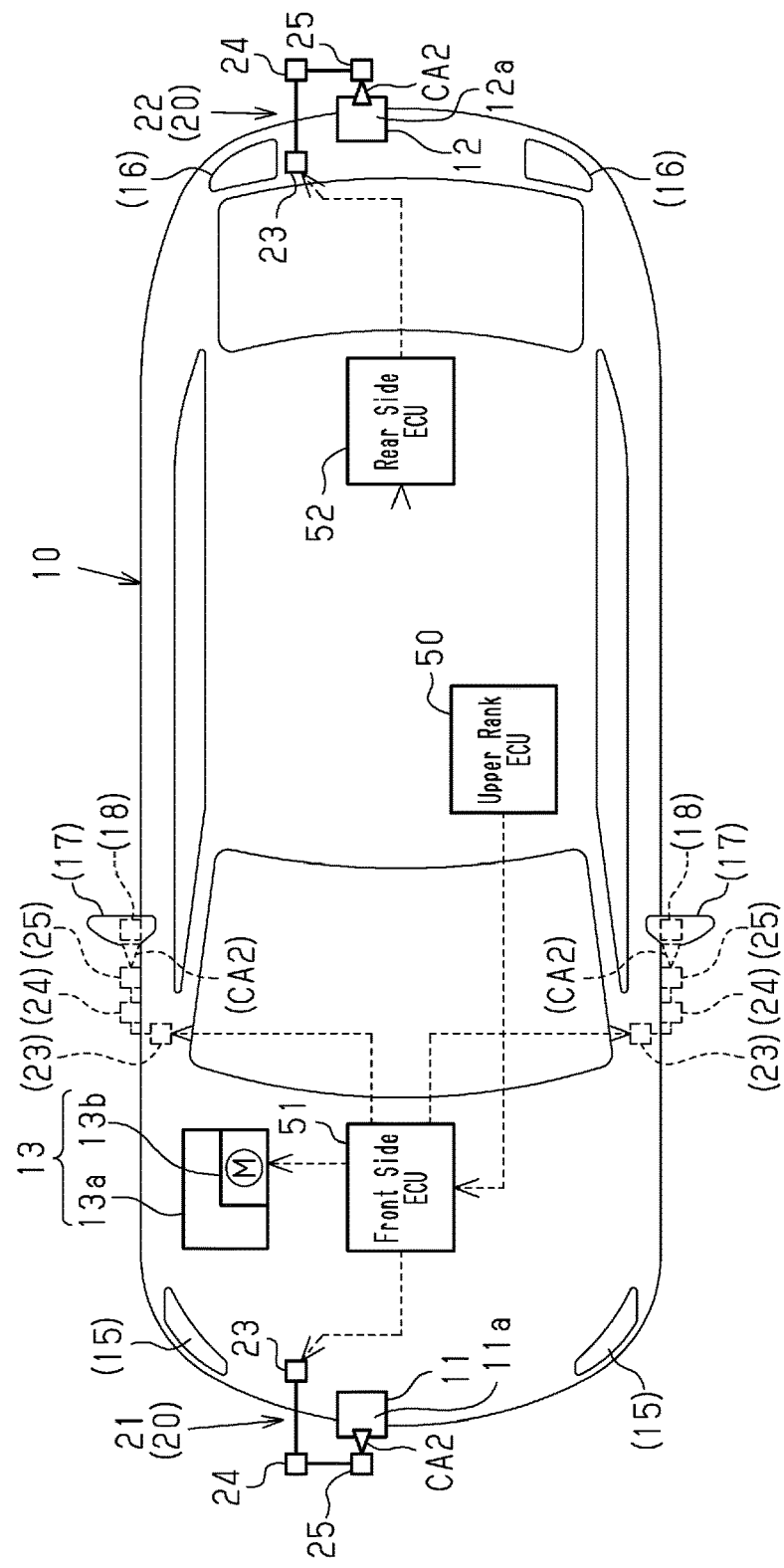
FIG. 1 is a schematic diagram of a vehicle cleaning system in accordance with a first embodiment and a second embodiment.

As shown in FIG. 1, a vehicle 10 includes a first distance measurement sensor 11 that is set at a middle portion of the front end and a second distance measurement sensor 12 that is set at a middle portion of the rear end. The first and second distance measurement sensors 11 and 12 each include an optical sensor that transmits and receives light of a predetermined wavelength in the frontward or rearward direction of the vehicle 10. The first and second distance measurement sensors 11 and 12 are each used in a distance measurement system (LIDAR or the like) that measures the distance from the vehicle to a front object or rear object or a system that provides the vehicle 10 with highly sophisticated driving assistance or allows for autonomous driving or the like.

The first and second distance measurement sensors 11 and 12 respectively include sensing surfaces 11a and 12a (e.g., outer surfaces of lenses, cover glasses, or the like) that are exposed to the outside from the vehicle 10. Foreign matter, such as raindrops, may collect on the sensing surfaces 11a and 12a and adversely affect the distance measurement accuracy. Thus, the vehicle 10 includes a vehicle cleaning system 20 to clean off foreign matter from each of the sensing surfaces 11a and 12a.

The vehicle cleaning system 20 includes first and second cleaning devices 21 and 22. The cleaned subject of the first cleaning device 21 is the first distance measurement sensor 11 set at the middle portion of the front end of the vehicle 10. The cleaned subject of the second cleaning device 22 is the second distance measurement sensor 12 set at the rear end of the middle portion of the vehicle 10.

Figure 2:
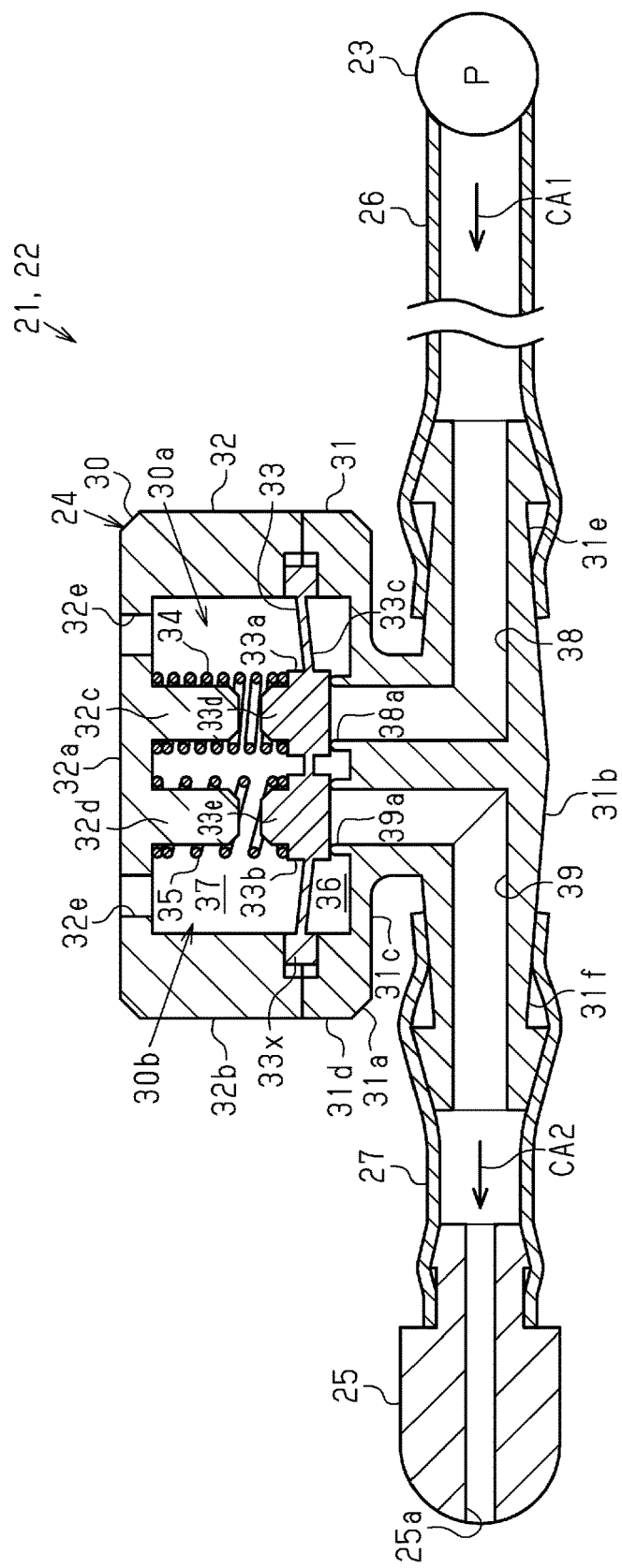
FIG. 2 is a schematic diagram of a cleaning device in accordance with the first embodiment.

As shown in FIG. 2, the first and second cleaning devices 21 and 22 each have the same construction and include a drive pump 23, a valve device 24, and an ejection nozzle 25. FIG. 2 will be referenced to in order to describe both of the first and second cleaning devices 21 and 22, which have the same construction.

In the first and second cleaning devices 21 and 22, the drive pump 23 and the valve device 24 are connected to each other by a connection hose 26, and the valve device 24 and the ejection nozzle 25 are connected to each other by a connection hose 27. The connection hoses 26 and 27 are rubber hoses or the like and formed from a flexible material. The drive pump 23 includes an electric air pump allowing for the generation of air CA1 that serves as a fluid. The valve device 24 converts the air CA1 that is continuously supplied from the drive pump 23 into air that is pulsed (intermittent) and has a high pressure. The valve device 24 supplies the ejection nozzle 25 with the high-pressure, pulsed air, or output air CA2 that is intermittently increased to a high pressure. The ejection nozzle 25 includes an ejection port 25a directed toward the sensing surfaces 11a and 12a of the corresponding first and second distance measurement sensors 11 and 12 shown in FIG. 1. The high-pressure, pulsed output air CA2 supplied from the valve device 24 is sprayed toward a preferred range in the corresponding one of the sensing surfaces 11a and 12a.

Preferably, the valve device 24 is located at a position proximate to the ejection nozzle 25 to minimize pressure loss of the output air CA2 generated by the valve device 24 before reaching the ejection nozzle 25. The connection hose 27 shown in FIG. 2 connecting the valve device 24 and the ejection nozzle 25 may be omitted, and the valve device 24 may be formed integrally with the ejection nozzle 25. The drive pump 23 may be located at a position proximate to or separated from the valve device 24. The drive pump 23 may be single drive pump that is shared by the first and second cleaning devices 21 and 22. When shared, the first and second cleaning devices 21 and 22 each include a pressure accumulator to accumulate the pressure of the air supplied from the same drive pump, and the cleaning devices 21 and 22 may receive the air supplied from the corresponding pressure accumulators.

Figure 3:
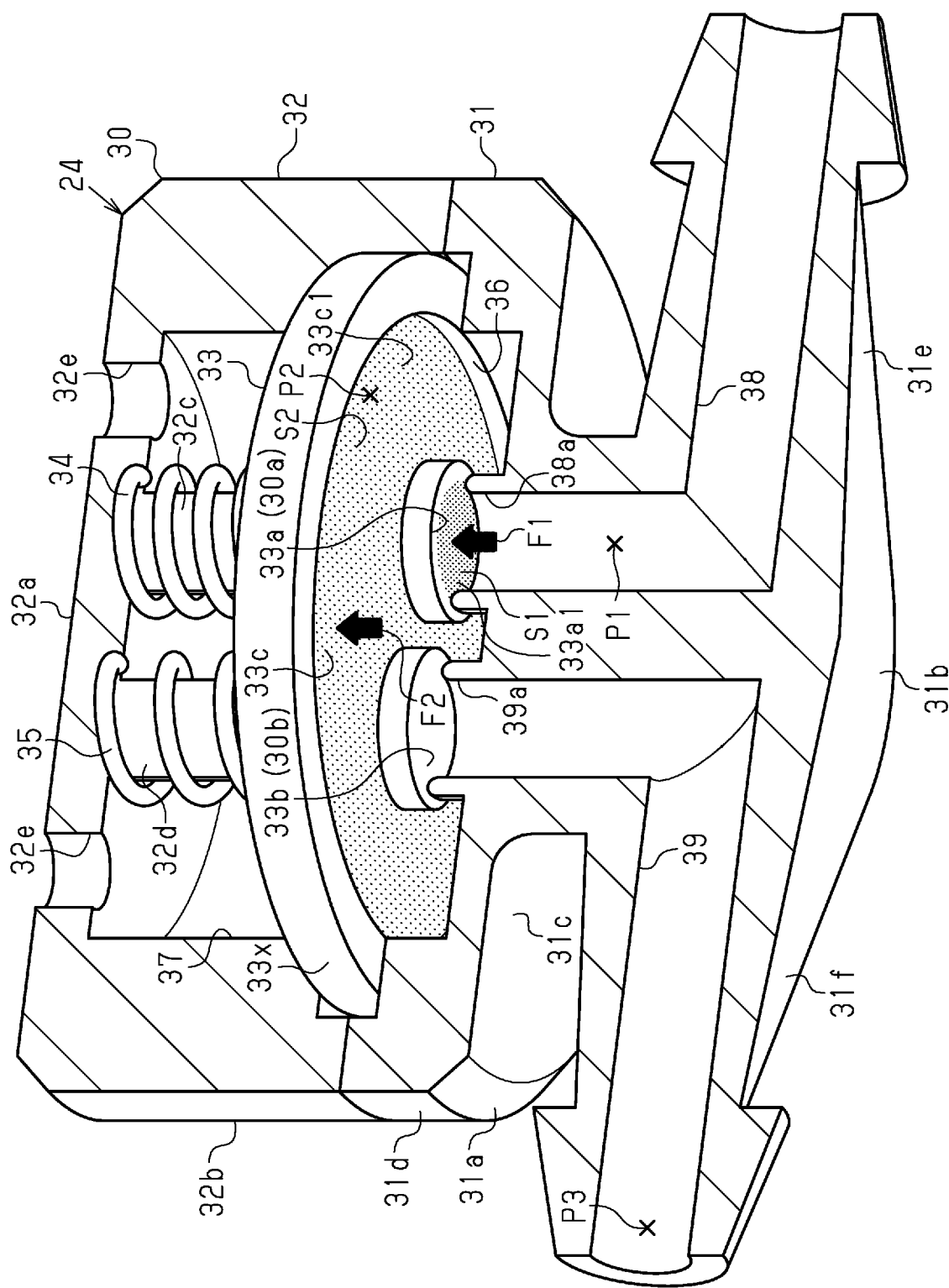
FIG. 3 is a schematic diagram of a valve device in accordance with the first embodiment.

As shown in FIGS. 2 and 3, the valve device 24 includes a base member 31, a cover member 32, a diaphragm 33, and urging springs 34 and 35. Among these components, the cover member 32, the diaphragm 33, the urging springs 34 and 35, and part of the base member 31 form a main valve body 30. The valve device 24 of the present embodiment has a simple construction including only the base member 31, the cover member 32, the diaphragm 33, and the urging springs 34 and 35, which are listed above. In the description hereafter, the location of the base member 31 will be described as the lower side of the valve device 24, and the location of the cover member 32 will be described as the upper side of the valve device 24. However, there are no limitations to directions during usage of the valve device 24.

The base member 31 is formed from plastic and incudes an upper portion defining a base 31a and a lower portion defining a connector 31b. The base 31a forms the lower part of a housing of the main valve body 30 and includes a circular bottom wall 31c and an annular side wall 31d that projects upward from the circumferential edge of the bottom wall 31c. The cover member 32 forms the upper part of the housing of the main valve body 30 and includes a circular top wall 32a and an annular side wall 32b that projects downward from the circumferential edge of the top wall 32a. The base member 31 and the cover member 32 are coupled so that the upper end surface of the side wall 31d and the lower end surface of the side wall 32b are in contact with each other. A circumferential edge 33x of the diaphragm 33 is held between the end surfaces. The circumferential edge 33x is held in a manner providing a seal. The diaphragm 33 partitions a valve chamber 36 defined by an open space formed by the diaphragm 33 and the bottom wall 31c and side wall 31d of the base 31a from a back pressure chamber 37 defined by an open space formed by the diaphragm 33 and the top wall 32a and side wall 32b of the cover member 32.

The connector 31b is arranged on the lower side of the base 31a first extending downward from the bottom wall 31c of the base 31a and then branched into two so as to have the form of letter T that is reversed upside down. One of the two branched sides of the connector 31b defines a pump connector 31e connected to the connection hose 26 located between the valve device 24 and the drive pump 23. The other one of the two branched sides of the connector 31b defines a nozzle connector 31f connected to the connection hose 27 located between the valve device 24 and the ejection nozzle 25. An intake passage 38 formed inside the pump connector 31e is independent from a discharge passage 39 formed inside the nozzle connector 31f. The intake passage 38 and the discharge passage 39 respectively include open portions 38a and 39a formed in a central portion of the bottom wall 31c of the base 31a. The open portions 38a and 39a are tubular and slightly projected from the bottom surface in the bottom wall 31c.

The diaphragm 33, which is disk-shaped and formed from a flexible material, has a central portion including cylindrical valve bodies 33a and 33b located at positions opposed toward the open portions 38a and 39a of the intake passage 38 and the discharge passage 39, respectively. The diaphragm 33 has a predetermined thickness at the valve bodies 33a and 33b and the circumferential edge 33x. The remaining portion, which is the part between the valve body 33a and the valve body 33b and the part between the circumferential edge 33x and the valve bodies 33a and 33b, defines a thin portion 33c that is thinner than the valve bodies 33a and 33b and the circumferential edge 33x. Thus, the diaphragm 33 is configured so that the thin portion 33c allows the valve bodies 33a and 33b to be moved relative to the fixed circumferential edge 33x and allows the valve bodies 33a and 33b to be moved relative to each other. Such movement of the valve bodies 33a and 33b allows the valve body 33a to come into contact with or move away from the open portion 38a of the intake passage 38 to open or close the passage between the drive pump 23 and the valve chamber 36 and allows the valve body 33b to come into contact with or move away from the open portion 39a of the discharge passage 39 to open or close the passage between the ejection nozzle 25 and the valve chamber 36.

The cover member 32, which is formed from plastic, includes projections 32c and 32d located on the top wall 32a at positions opposed toward the valve bodies 33a and 33b, respectively. The projections 32c and 32d serve as position restriction projections for the urging springs 34 and 35, which are formed by compression coil springs. The upper sides of the urging springs 34 and 35 are fitted to the projections 32c and 32d, respectively. The upper ends of the urging springs 34 and 35 contact the top wall 32a. The lower ends of the urging springs 34 and 35 contact the valve bodies 33a and 33b. Thus, the urging springs 34 and 35 urge the valve bodies 33a and 33b downward from the top wall 32a. That is, the urging springs 34 and 35 urge the valve bodies 33a and 33b toward the open portions 38a and 39a of the intake passage 38 and the discharge passage 39. The urging force of the urging spring 35 is set to be relatively smaller than the urging force of the urging spring 34.

The upper surfaces of the valve bodies 33a and 33b include protrusions 33d and 33e. The lower sides of the urging springs 34 and 35 are fitted to the protrusions 33d and 33e, respectively. Thus, the protrusions 33d and 33e restrict the positions of the urging springs 34 and 35 relative to the valve bodies 33a and 33b and limit displacement. In particular, the protrusions 33d and 33e are preferred when the urging springs 34 and 35 constantly apply appropriate urging forces to the valve bodies 33a and 33b that are located at positions separated from the center of the diaphragm 33 like in the present embodiment. The protrusions 33d and 33e and the projections 32c and 32d do not necessarily have to be used.

The top wall 32a of the cover member 32 includes, for example, two communication holes 32e at positions located outward from the projections 32c and 32d to connect the back pressure chamber 37 to the outside of the cover member 32 (expose to atmosphere) so that the pressure of the back pressure chamber 37 does not affect the movement of each of the valve bodies 33a and 33b. This allows the valve bodies 33a and 33b of the diaphragm 33 to move quickly.

The valve device 24 of each of the first and second cleaning devices 21 and 22 are formed in this manner. In the main valve body 30 of the valve device 24, the side of the valve body 33a, which is the side of the intake passage 38, forms a first valve 30a, and the side of the valve body 33b, which is the side of the discharge passage 39, forms a second valve 30b. The operation of the valve device 24 will be described in detail later.

As shown in FIG. 1, the drive pump 23 of each of the first and second cleaning devices 21 and 22 is controlled by various types of electronic control units (ECUs) installed in the vehicle 10, more specifically, an upper rank ECU 50, a front side ECU 51, and a rear side ECU 52. The front side ECU 51 includes a functionality for controlling the drive pump 23 of the first cleaning device 21, and the rear side ECU 52 includes a functionality for controlling the drive pump 23 of the second cleaning device 22. The upper rank ECU 50 cohesively controls the front side ECU 51 and the rear side ECU 52.

The operation of the present embodiment will now be described.

When foreign matter such as raindrops collect on the sensing surfaces 11a and 12a of the first and second distance measurement sensors 11 and 12 or whenever a predetermined time elapses regardless of whether there is foreign matter, the upper rank ECU 50 issues a cleaning instruction via the front and rear side ECUs 51 and 52 to the corresponding first and second cleaning devices 21 and 22 and drives the drive pump 23 of each of the cleaning devices 21 and 22.

As shown in FIG. 2, when the valve device 24 of each of the cleaning devices 21 and 22 is inactive, the first and second valves 30a and 30b are completely closed, that is, the valve bodies 33a and 33b of the diaphragm 33 seal the open portions 38a and 39a of the intake passage 38 and the discharge passage 39.

Figure 6:
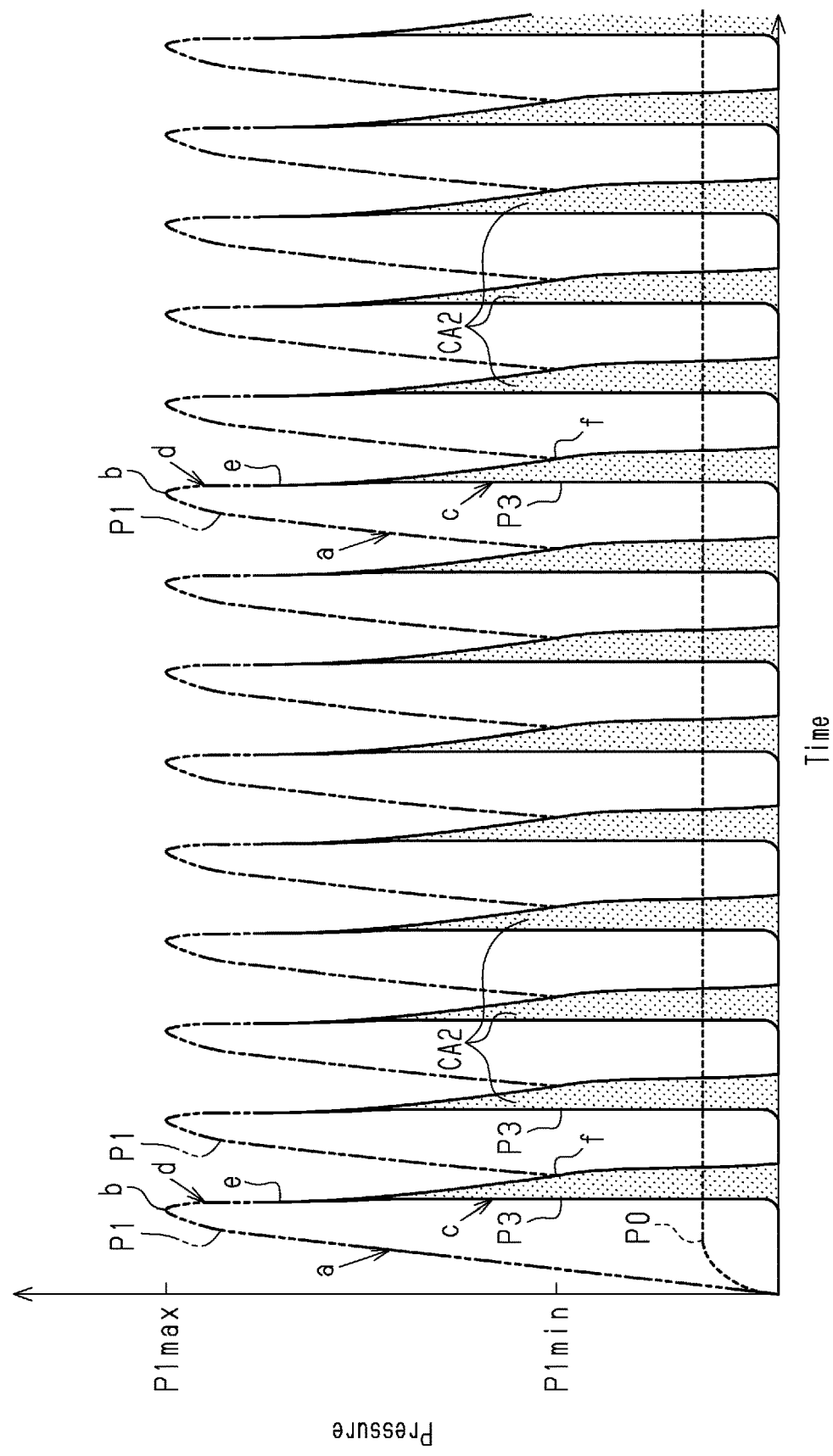
FIG. 6 is a waveform chart illustrating the operation of the cleaning device in accordance with the first embodiment.

When the drive pump 23 is driven to continuously supply air CA1, the urging by the urging spring 34 keeps the valve body 33a closed so that the pressure P1 of the portion including the intake passage 38 of the valve device 24 and the connection hose 26 (hereinafter referred to as "the intake pressure P1") increases as shown by arrow a in FIG. 6. As shown in FIG. 3, the intake pressure P1 acts on the valve body 33a at a portion having a relatively small area S1 and corresponding to the area of the open portion 38a. The lifting force F1 acting on the valve body 33a is the product of the intake pressure P1 and the area S1, which is F1=P1×S1. As shown in FIG. 6, in a state in which the valve is closed, the intake pressure P1 is increased to be high enough as compared to the discharge pressure P0 of the drive pump 23 that is the pressure of the connection hose 26 if the drive pump 23 were to be driven with the drive pump 23 directly connected to the ejection nozzle 25 by the connection hose 26 (hereinafter simply referred to as "the discharge pressure P0 of the drive pump 23"). The discharge pressure P0 of the drive pump 23 is not the discharge pressure obtained when the discharge portion of the drive pump 23 is fully closed (when the flow rate of the drive pump 23 is zero).

Figure 4:
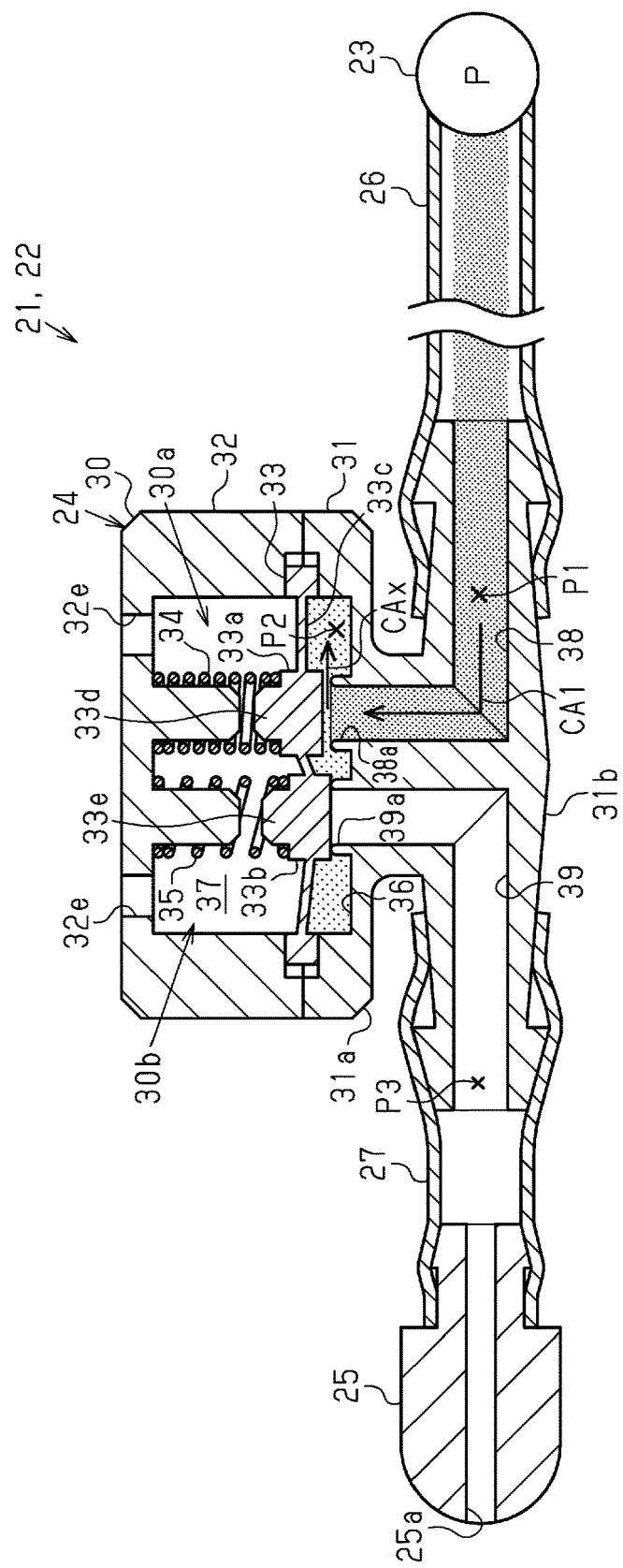
FIG. 4 is a schematic diagram illustrating the operation of the cleaning device in accordance with the first embodiment.

As the intake pressure P1 increases, a slight gap forms in the first valve 30a between the valve body 33a and the open portion 38a as shown in FIG. 4, and some of the air CA1, of which the pressure P1 has been increased, slightly leaks into the valve chamber 36 as leakage air CAx. This gradually increases the pressure P2 of the valve chamber 36. As shown in FIG. 3, the pressure P2 of the valve chamber 36 acts on the thin portion 33c of the diaphragm 33 at a portion having a relatively large area S2 and corresponding to the area of the entire thin portion 33c (more specifically, including the circumferential edges of the valve bodies 33a and 33b) excluding the areas of the open portions 38a and 39a. In this case, the lifting force F2 acting on the thin portion 33c is the product of the pressure P2 of the valve chamber 36 and the area S2, which is F2=P2×S2. The area S2 of the thin portion 33c on which the pressure P2 acts is larger than the area S1 of the valve body 33a on which the pressure P1 acts. Thus, the pressure P2 has a large effect on the lifting force F2 even though it is lower than the pressure P1.

Figure 5:
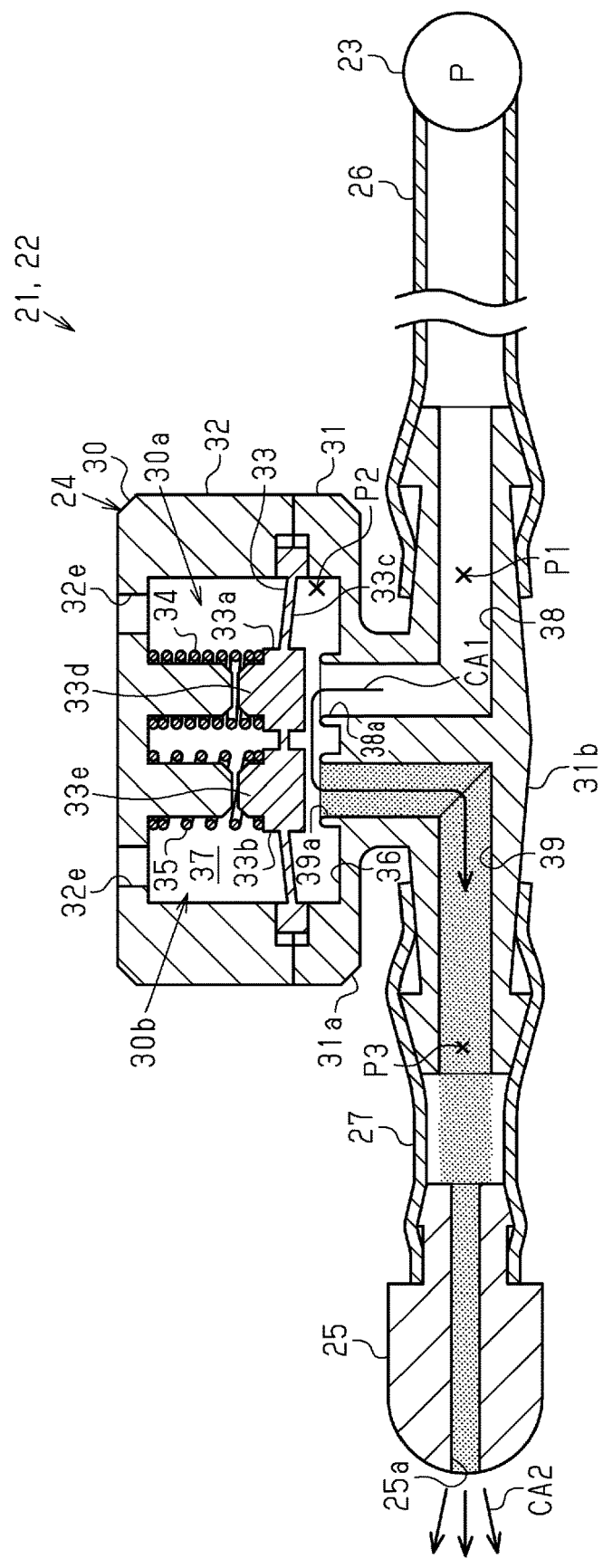
FIG. 5 is a schematic diagram illustrating the operation of the cleaning device in accordance with the first embodiment.

When the intake pressure P1 and the pressure P2 of the valve chamber 36 both increase and the intake pressure P1 reaches point b as shown in FIG. 6, the total of the lifting force F1 of the valve body 33a and the lifting force F2 of the thin portion 33c, or the lifting force "F1+F2" of the diaphragm 33, exceeds a predetermined lifting force (two urging forces of urging springs 34 and 35). As shown in FIG. 5, this moves the entire diaphragm 33 greatly and opens both of the first and second valves 30a and 30b. That is, the valve bodies 33a and 33b are both separated from the open portions 38a and 39a, and the intake passage 38, the valve chamber 36, and the discharge passage 39 are connected.

The intake pressure P1 immediately before the valve opens is increased to point b, which is shown in FIG. 6 and high enough as compared to the discharge pressure P0 of the drive pump 23. When the valve opens, the high-pressure air CA1 in the intake passage 38 suddenly flows through the valve chamber 36 into the discharge passage 39. This suddenly increases the discharge pressure P3 as shown by arrow c in FIG. 6. Thus, the ejection nozzle 25 is supplied with high-pressure air, or the output air CA2.

Further, the intake pressure P1 suddenly decreases as shown by arrow d in FIG. 6. From when the discharge pressure P3 becomes equal to the intake pressure P1 at point e, which is shown in FIG. 6, the two pressures P3 and P1 both decrease to point f, which is shown in FIG. 6. At point f, the diaphragm 33 is switched from a state opening the valve to a state closing the valve. Thus, the pressure P2 of the valve chamber 36 also decreases, the urging force of the urging springs 34 and 35 becomes greater than the lifting force "F1+F2" of the diaphragm 33, which is based on the two pressures P1 and P2, and the valve bodies 33a and 33b of the first and second valves 30a and 30b close the open portions 38a and 39a of the intake passage 38 and the discharge passage 39. The discharge pressure P3 becomes zero, and the intake pressure P1 starts to increase again. The intake pressure P1 is increased again until the leakage air CAx opens the valve with the diaphragm 33. The actions described above are repeated to consecutively generate the high-pressure, pulsed output air CA2.

Figure 11:
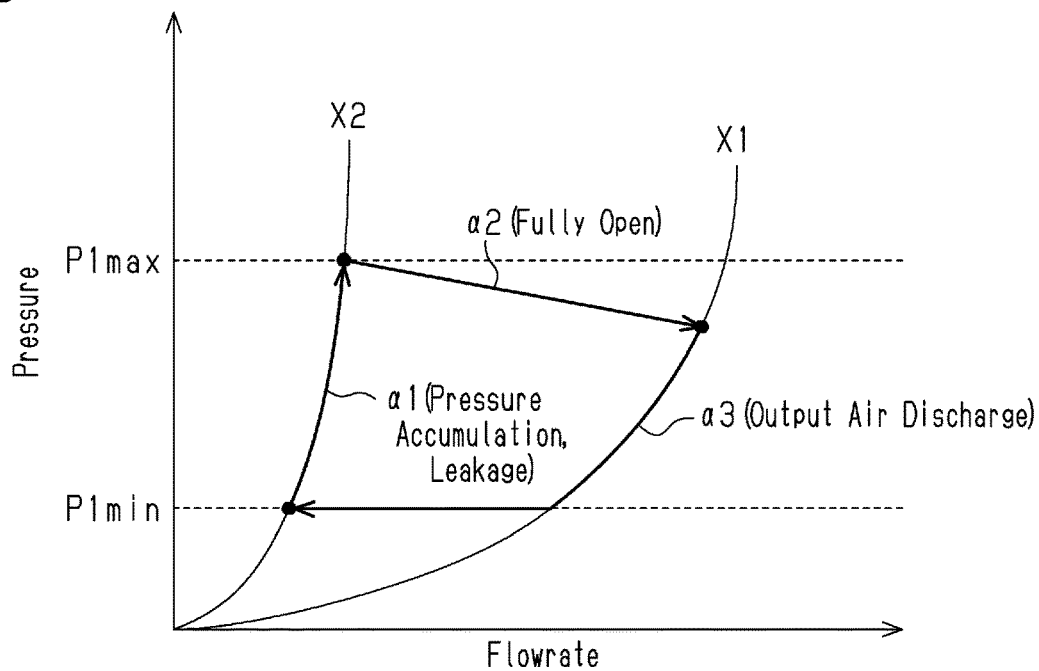
FIG. 11 is a chart illustrating the operation of the valve device in accordance with the embodiment.

The operation of the valve device 24 in accordance with the present embodiment will now be described with reference to the chart of FIG. 11. The valve device 24 in accordance with the present embodiment is configured to switch between a state actuated in correspondence with a first characteristic line X1 and a state actuated in correspondence with a second characteristic line X2. The first characteristic line X1 is equivalent to the characteristics of the flow rate and pressure when a nozzle of which the ejection port has a first diameter is directly connected by a hose to the drive pump 23. The second characteristic line X2 is equivalent to a characteristic line equivalent to the characteristics of the flow rate and pressure when a nozzle of which the ejection port has a second diameter is directly connected by a hose to the drive pump 23. The second diameter is much smaller than the first diameter. A state in which the first-diameter nozzle is directly connected by a hose to the drive pump 23 is equivalent to a state in which the valve body 33a is open, and a state in which the second-diameter nozzle is directly connected by a hose to the drive pump 23 is equivalent to a state in which the leakage air CAx is being generated while the valve body 33a is closed.

More specifically, when the valve body 33a of the diaphragm 33 is opening the open portion 38a of the intake passage 38, the valve device 24 is actuated in correspondence with the second characteristic line X2 (arrow α1 in FIG. 11), and the intake pressure P1 of the valve device 24 is increased and accumulated at a low flow rate within a short period of time as shown by the second characteristic line X2. In this case, an increase in the pressure P1 slightly increases the flow rate of air. This is because with the valve device 24 in accordance with the present embodiment, even when the valve body 33a is closed, a slight gap is formed between the valve body 33a and the open portion 38a to generate the leakage air CAx as if air were to be discharged from a nozzle having an extremely small diameter (second diameter).

When the intake pressure P1 reaches the maximum pressure P1max, the valve body 33a moves to open, and the output air CA2 having the maximum pressure P1max is discharged toward the downstream side of the valve body 33a. In this state, the valve device 24 is actuated so that the characteristics shift toward the first characteristic line X1 (arrow α2 in FIG. 11). The valve device 24 instantaneously discharges the output air CA2 as if air were discharged from a nozzle having a large diameter (second diameter) under a high pressure at a flow rate that is high enough as compared to the leakage air CAx in correspondence with the first characteristic line X1 (arrow α3 in FIG. 11).

Figure 12:
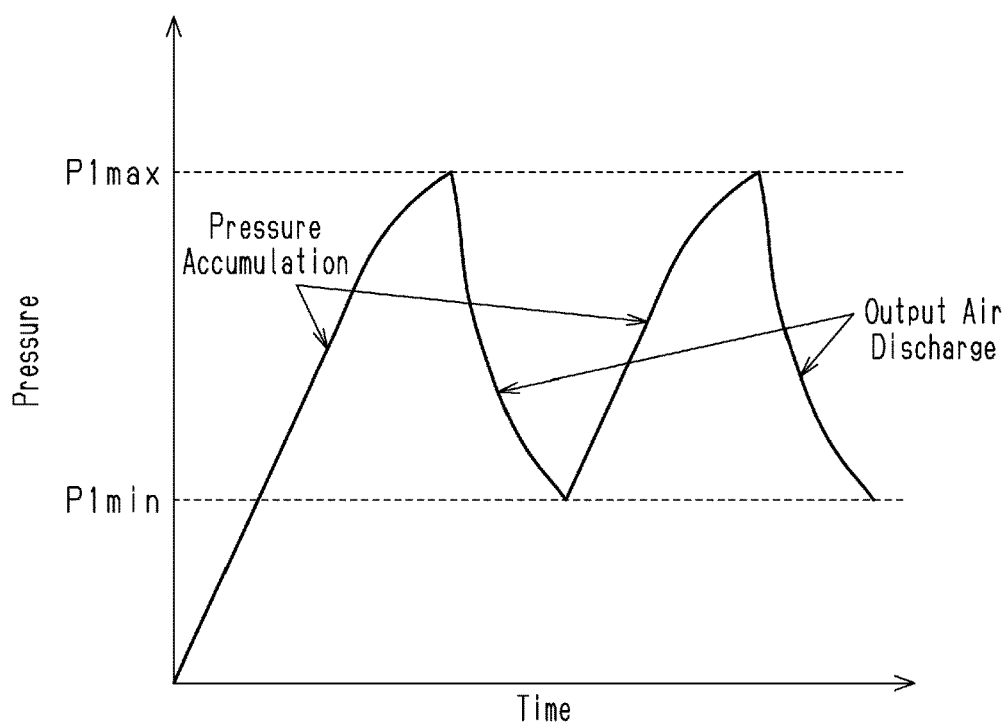
FIG. 12 is a waveform chart illustrating the operation of the valve device in accordance with the embodiment.

When the intake pressure P1 reaches the minimum pressure P1min, the valve body 33a moves to close and returns to the state corresponding to the second characteristic line X2. Then, the pressure accumulation and leakage process shown by arrow α1, the opening process shown by arrow α2, the discharge process of the output air CA2 shown by arrow α3, and the process for returning to the process shown by arrow α1 are repetitively performed as shown in FIG. 12 to generate and discharge the high-pressure, pulsed output air CA2.

In the present embodiment, when "Ps" is a shut-off pressure obtained in a state in which the discharge port of the drive pump 23 is fully closed, the maximum pressure P1max is set to be greater than ⅓ of the shut-off pressure Ps (Ps/3<P1max). The minimum pressure P1min is set to be less than ⅔ of the shut-off pressure Ps (P1min<2Ps/3). In this case, P1min<P1max is satisfied. The pressure P1min is set to be less than 80% of the pressure P1max (P1min<0.8P1max) regardless of changes from the pressure P1max at which the valve body 33a of the diaphragm 33 performs an opening action to the pressure P1min at which the valve body 33a performs a closing action.

The high-pressure, pulsed output air CA2 generated in this manner is sprayed from the ejection nozzle 25 against the sensing surfaces 11a and 12a of the first and second distance measurement sensors 11 and 12. This effectively removes foreign matter such as raindrops from the sensing surfaces 11a and 12a and allows the distance measurement accuracy to be maintained at a satisfactory level. In addition, the output air CA2 that can be generated has a pressure that is high enough as compared with the discharge pressure P0 of the drive pump 23. This allows for the use of a compact drive pump 23.

As shown in FIG. 1, the front side ECU 51 may use a washer device 13, which is typically installed in the vehicle 10, in cooperation with the first and second cleaning devices 21 and 22. The washer device 13 includes a tank 13a that stores a cleaning liquid and a washer pump 13b that is driven to supply the cleaning liquid to the windshield or the like. The output air CA2 can be sprayed after supplying the cleaning liquid to the sensing surfaces 11a and 12a. This improves the effect for cleaning off foreign matter that is difficult to remove just by spraying air.

The advantages of the first embodiment will now be described.

(1-1) In the valve device 24, which is located between the drive pump 23 and the ejection nozzle 25, the first valve 30a closes the intake passage 38 with the valve body 33a and accumulates the pressure of the air CA1 supplied from the drive pump 23 until the pressure becomes higher than the discharge pressure P0 of the drive pump 23. The first valve 30a, the second valve 30b, the diaphragm 33, the valve chamber 36, and the like that function as the auxiliary mechanism of the valve device 24 uses the air CA1 from the intake passage 38 during the pressure accumulation to generate the leakage air CAx and accumulate pressure in the valve chamber 36. Then, the two pressures P1 and P2 accumulated in the intake passage 38 and the valve chamber 36 open the valve bodies 33a and 33b to output the air CA1, of which the pressure has been accumulated in the intake passage 38, to the discharge passage 39. The valve bodies 33a and 33b are then closed to allow pressure to be re-accumulated in the intake passage 38. Consequently, the output air CA2, which has a higher pressure than the discharge pressure P0 of the drive pump 23 that would be obtained when continuously discharging the air CA1 from the drive pump 23, is repetitively sprayed from the ejection nozzle 25 against the sensing surfaces 11a and 12a of the distance measurement sensors 11 and 12. Thus, the cleaning capability for removing foreign matter from the sensing surfaces 11a and 12a can be maintained or further increased without enlarging the drive pump 23.

(1-2) The second valve 30b closes the discharge passage 39 to accumulate the pressure of the leakage air CAx, which is generated from the air CA1, in the valve chamber 36. This ensures that pressure is accumulated. Thus, the valve device 24 in accordance with the present embodiment stabilizes operation.

(1-3) The first valve body 33a and the second valve body 33b are arranged integrally on the single diaphragm 33, and the first valve 30a and the second valve 30b form the single valve device 24. This allows components to be shared, reduces the number of components and assembly steps, and facilitates handling of the valve device 24.

(1-4) The area S2 of the thin portion 33c of the diaphragm 33 on which the pressure P2 of the leakage air CAx, which is generated from the air CA1, accumulated in the valve chamber 36 acts is larger than the area S1 of the first valve body 33a on which the pressure P1 accumulated in the intake passage 38 acts. Thus, even with the relatively small pressure P2 (P1>P2), the diaphragm 33 can be actuated. This allows the valve device 24 to be smoothly operated.

(1-5) The cover member 32 of the valve device 24 includes the communication holes 32e connecting the back pressure chamber 37, which is partitioned by the diaphragm 33, to the outside. This exposes the back pressure chamber 37 to the atmosphere. Thus, the valve bodies 33a and 33b of the diaphragm 33 can move quickly.

Second Embodiment

A system and method for cleaning a vehicle in accordance with a second embodiment will now be described. In the present embodiment, the valve device used in the vehicle cleaning system has a different construction. Thus, the description hereafter will focus on the valve device.

Figure 7:
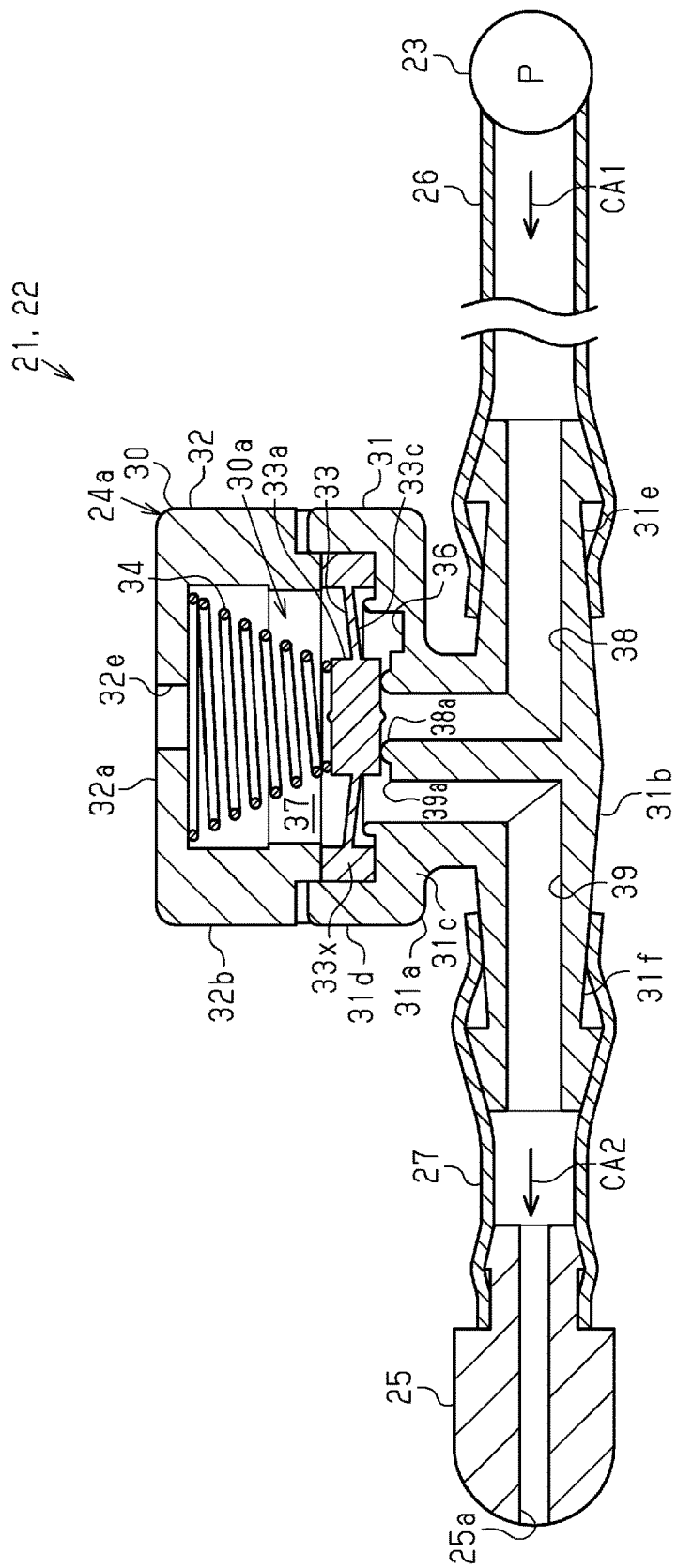
FIG. 7 is a schematic diagram of a cleaning device in accordance with the second embodiment.
Figure 8:
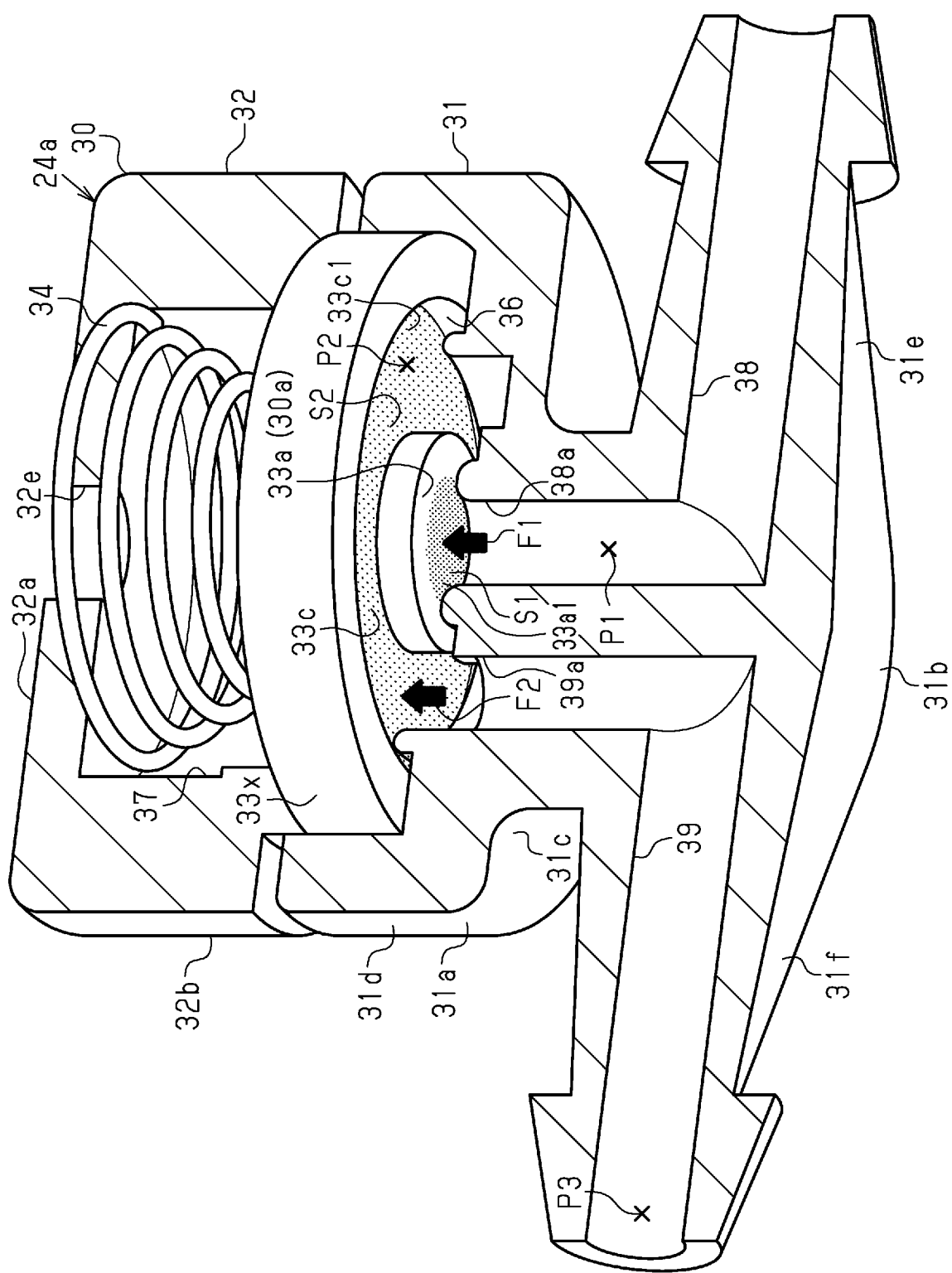
FIG. 8 is a schematic diagram of a valve device in accordance with the second embodiment.

As shown in FIGS. 7 and 8, a valve device 24a in accordance with the present embodiment is constructed by excluding the second valve 30b from the valve device 24 in accordance with the first embodiment and including the first valve 30a. In the description hereafter, the first valve 30a and the first valve body 33a will simply be referred to as the valve 30a and the valve body 33a.

The diaphragm 33 of the present embodiment is located at the central portion of the valve body 33a, which forms the valve 30a. Accordingly, the open portion 38a of the intake passage 38 is located at the central portion of the bottom wall 31c in the base 31a of the base member 31 and projected in a tubular form in the same manner as the first embodiment. The open portion 39a of the discharge passage 39 is located in the circumferential portion of the bottom wall 31c and has a non-projecting form so as not to interfere with the valve body 33a.

The valve body 33a of the valve 30a is urged by only the urging spring 34. The urging spring 34 of the present embodiment has the form of a truncated cone in a side view and includes a lower end that contacts the valve body 33a and an upper end that contacts the top wall 32a of the cover member 32. Further, movement of the urging spring 34, which is formed so that the upper end is larger than the lower end, is restricted by the side wall 32b of the cover member 32. Thus, the top wall 32a does not need a projection to restrict movement of the urging spring 34. Further, the top wall 32a includes, for example, a single communication hole 32e that connects the back pressure chamber 37 to the outside of the cover member 32 (expose to atmosphere). The communication hole 32e is arranged in the central portion of the top wall 32a and located at the inner side of the upper end of the urging spring 34 in the widthwise direction.

The operation of the present embodiment will now be described. The description will focus on the valve device 24a.

As shown in FIG. 7, when the valve device 24a is inactive, the valve 30a is completely closed, that is, the valve body 33a of the diaphragm 33 seals the open portion 38a of the intake passage 38. When the drive pump 23 is driven to continuously supply air CA1, the urging by the urging spring 34 keeps the valve body 33a closed so that the pressure P1 of the portion including the intake passage 38 of the valve device 24a and the connection hose 26 (hereinafter referred to as "the intake pressure P1") increases. As shown in FIG. 8, in the present embodiment, the intake pressure P1 acts on the valve body 33a at a portion having a relatively small area S1 and corresponding to the area of the open portion 38a in the same manner as the first embodiment. In this case, the lifting force F1 acting on the valve body 33a is the product of the intake pressure P1 and the area S1, which is $F1=P1\times S1$. In a state in which the valve is closed, the intake pressure P1 is increased to be high enough as compared to the discharge pressure P0 of the drive pump 23 that is the pressure of the connection hose 26 if the drive pump 23 were to be driven with the drive pump 23 directly connected to the ejection nozzle 25 by the connection hose 26.

Figure 9:
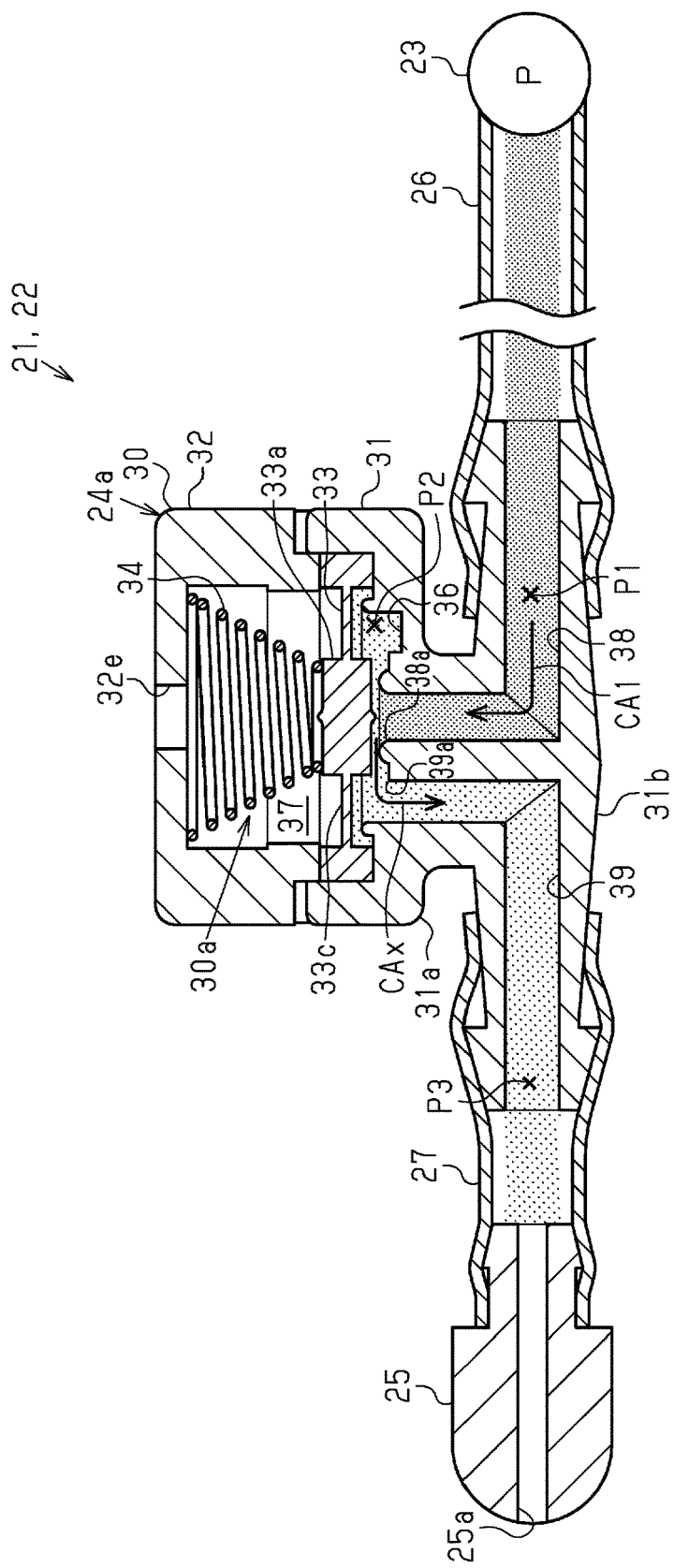
FIG. 9 is a schematic diagram illustrating the operation of the cleaning device in accordance with the second embodiment.

As the intake pressure P1 increases, a slight gap forms in the valve 30a between the valve body 33a and the open portion 38a as shown in FIG. 9, and some of the air CA1 slightly leaks into the valve chamber 36 as leakage air CAx. The present embodiment does not include an element corresponding to the second valve 30b of the first embodiment (refer to FIG. 2), and the valve chamber 36 is constantly connected to the discharge passage 39. However, the ejection nozzle 25 located further downstream functions as a restriction. More specifically, the amount of air CA1 flowing out of the ejection nozzle 25 is less than the amount of the leakage air CAx, which is generated by some of the air CA1 leaking into the valve chamber 36 (leakage amount from intake passage 38 to valve chamber 36). Thus, in the same manner as the first embodiment, the pressure P2 of the valve chamber 36 gradually increases. In the present embodiment, the pressure P2 of the valve chamber 36 increases together with the pressure of the discharge passage 39, that is, the discharge pressure P3. the pressure P2 of the valve chamber 36 acts on the thin portion 33c of the diaphragm 33 at a portion having a relatively large area S2 and corresponding to the area of the entire thin portion 33c (more specifically, including the circumferential edge of the valve body 33a) excluding the area of the open portion 38a. The lifting force F2 acting on the thin portion 33c is the product of the pressure P2 of the valve chamber 36 and the area S2, which is $F2=P2\times S2$. In the present embodiment, the area S2 of the thin portion 33c on which the pressure P2 acts is larger than the area S1 of the valve body 33a on which the pressure P1 acts. Thus, the pressure P2 has a large effect on the lifting force F2 even though it is lower than the pressure P1 in the same manner as the first embodiment.

Figure 10:
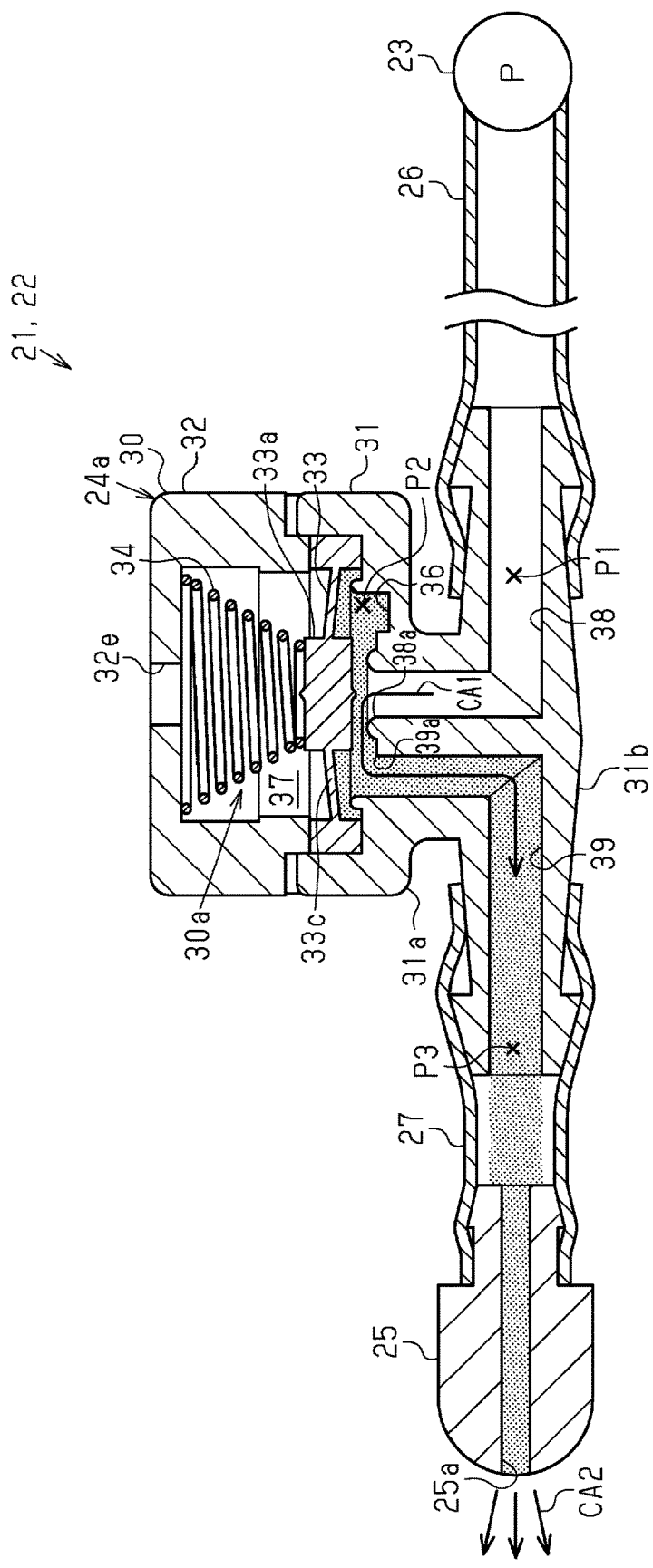
FIG. 10 is a schematic diagram illustrating the operation of the cleaning device in accordance with the second embodiment.

When the intake pressure P1 and the pressure P2 of the valve chamber 36 both increase, the lifting force "F1+F2" of the diaphragm 33, which is the total of the lifting force F1 of the valve body 33a and the lifting force F2 of the thin portion 33c, become greater than a predetermined lifting force (urging force of urging spring 34). As shown in FIG. 10, this moves the entire diaphragm 33 greatly and opens the valve 30a. That is, the valve body 33a is separated from the open portion 38a, and the intake passage 38, the valve chamber 36, and the discharge passage 39 are connected.

The intake pressure P1 immediately before the valve opens is high enough as compared to the discharge pressure P0 of the drive pump 23. When the valve opens, the high-pressure air CA1 in the intake passage 38 suddenly flows through the valve chamber 36 into the discharge passage 39. Thus, the discharge pressure P3 suddenly increases, and the ejection nozzle 25 is supplied with high-pressure air, or the output air CA2.

In this state, the intake pressure P1 suddenly decreases and switches the diaphragm 33 from a state opening the valve to a state closing the valve. Thus, the urging force of the urging spring 34 becomes greater than the lifting force "F1+F2" of the diaphragm 33, which is based on the two pressures P1 and P2, and the valve body 33a of the valve 30a closes the open portion 38a of the intake passage 38. The discharge pressure P3 becomes zero, and the intake pressure P1 starts to increase again. The intake pressure P1 is increased again until the leakage air CAx opens the valve with the diaphragm 33. In this manner, the actions described above are also repeated in the present embodiment to consecutively generate the high-pressure, pulsed output air CA2.

The advantages of the second embodiment will now be described.

(2-1) In the valve device 24a of the present embodiment, the valve 30a accumulates the pressure of the air CA1 supplied from the drive pump 23 until the pressure becomes higher than the discharge pressure P0 of the drive pump 23 in the same manner as the first embodiment. The valve 30a, the diaphragm 33, the valve chamber 36, and the like that function as the auxiliary mechanism of the valve device 24a uses the air CA1 from the intake passage 38 during the pressure accumulation to generate the leakage air CAx and accumulate pressure in the valve chamber 36 and the downstream discharge passage 39. Then, the two pressures P1 and P2 accumulated in the intake passage 38 and the valve chamber 36 open the valve body 33a and outputs the air CA1, of which the pressure has been accumulated in the intake passage 38, to the discharge passage 39. The valve body 33a is then closed to allow pressure to be accumulated again in the intake passage 38. With the present embodiment, the output air CA2, which has a higher pressure than the discharge pressure P0 of the drive pump 23 that would be obtained when continuously discharging the air CA1 from the drive pump 23, is also repetitively sprayed from the ejection nozzle 25 against the sensing surfaces 11a and 12a of the distance measurement sensors 11 and 12. Thus, the cleaning capability for removing foreign matter from the sensing surfaces 11a and 12a can be further increased without enlarging the drive pump 23.

(2-2) The ejection nozzle 25 functions as a restriction to accumulate the pressure of the leakage air CAx, which is generated from the air CA1, in the valve chamber 36 and the downstream discharge passage 39. This allows the second valve 30b of the first embodiment to be omitted. Thus, the valve device 24a of the present embodiment has a simplified structure.

(2-3) The area S2 of the thin portion 33c of the diaphragm 33 on which the pressure P2 of the leakage air CAx, which is generated from the air CA1 and accumulated in the valve chamber 36 or the like, acts is larger than the area S1 of the valve body 33a on which the pressure P1 accumulated in the intake passage 38 acts. This allows the diaphragm 33 to be actuated even with the relatively small pressure P2. Thus, the present embodiment also allows the valve device 24a to be smoothly actuated.

(2-4) The cover member 32 of the valve device 24a also includes the communication hole 32e connecting the back pressure chamber 37, which is partitioned by the diaphragm 33, to the outside. This exposes the back pressure chamber 37 to the atmosphere. Thus, the valve body 33a of the diaphragm 33 can move quickly.

Third Embodiment

Figure 14:
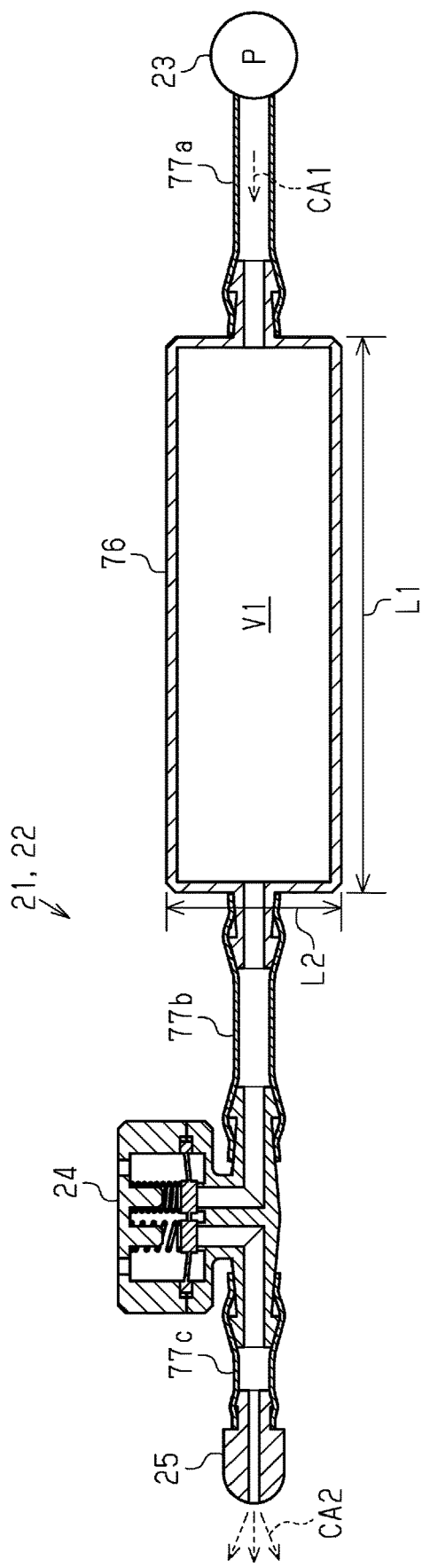
FIG. 14 is a schematic diagram of a cleaning device in accordance with the third embodiment.

A system and method for cleaning a vehicle in accordance with a third embodiment will now be described. The vehicle cleaning system in accordance with the third embodiment differs from the first embodiment in that the vehicle cleaning system includes the chamber 76, which is shown in FIG. 14 and other drawings. Components that are the same as the corresponding components of the first embodiment will not be described in detail.

Figure 15:
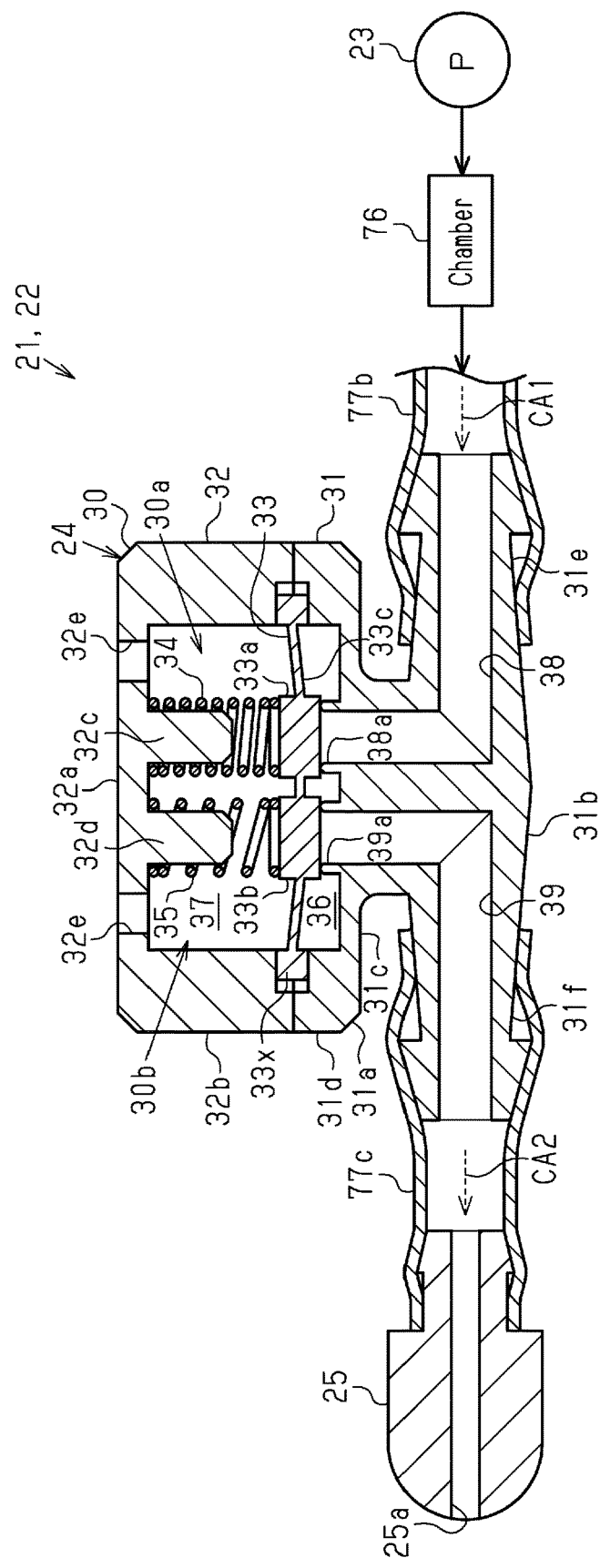
FIG. 15 is a schematic diagram of a cleaning device in accordance with the third embodiment.

As shown in FIGS. 14 and 15, the first and second cleaning devices 21 and 22 have the same construction and each include the drive pump 23, the valve device 24, the ejection nozzle 25, and the chamber 76. FIGS. 14, 15, and other drawings will be referenced to in order to describe both of the first and second cleaning devices 21 and 22, which have the same construction.

In the first and second cleaning devices 21 and 22, the drive pump 23 and the valve device 24 are connected to each other by the chamber 76. More specifically, the drive pump 23 and the chamber 76 are connected to each other by a connection hose 77a, and the chamber 76 and the valve device 24 are connected to each other by a connection hose 77b. The valve device 24 and the ejection nozzle 25 are connected to each other by a connection hose 77c. The connection hose 77a, 77b, and 77c are rubber hoses or the like and formed from a flexible material.

The drive pump 23 includes, for example, an electric air pump such as a gear pump serving as a volumetric pump that allows for the generation of air CA1 serving as a fluid. The chamber 76, which, for example, is tubular and has a closed bottom, stores a predetermined volume V1 of the air CA1 generated by the drive pump 23 and supplies the downstream valve device 24 with the air CA1 of which the pressure fluctuation is small enough. Thus, the chamber 76 stabilizes the supply of air CA1 to the valve device 24. The valve device 24 converts the air CA1 continuously supplied from the drive pump 23 via the chamber 76 into air CA1 that is pulsed (intermittent) and has a high-pressure. The valve device 24 supplies the ejection nozzle 25 with output air CA2 that is pulsed and has a high-pressure. In other words, the output air CA2 is intermittently increased to a high pressure. The ejection nozzle 25 includes the ejection port 25a directed toward the corresponding one of the sensing surfaces 11a and 12a of the first and second distance measurement sensors 11 and 12 shown in FIG. 13. The high-pressure, pulsed output air CA2 supplied from the valve device 24 is sprayed toward a preferred range in the corresponding one of the sensing surfaces 11a and 12a.

Preferably, the valve device 24 is located at a position proximate to the ejection nozzle 25 to minimize pressure loss of the output air CA2 generated by the valve device 24 before reaching the ejection nozzle 25. The connection hose 77 shown in FIG. 15 connecting the valve device 24 and the ejection nozzle 25 may be omitted, and the valve device 24 may be formed integrally with the ejection nozzle 25. The first and second cleaning devices 21 and 22 may share the same drive pump.

Figure 16:
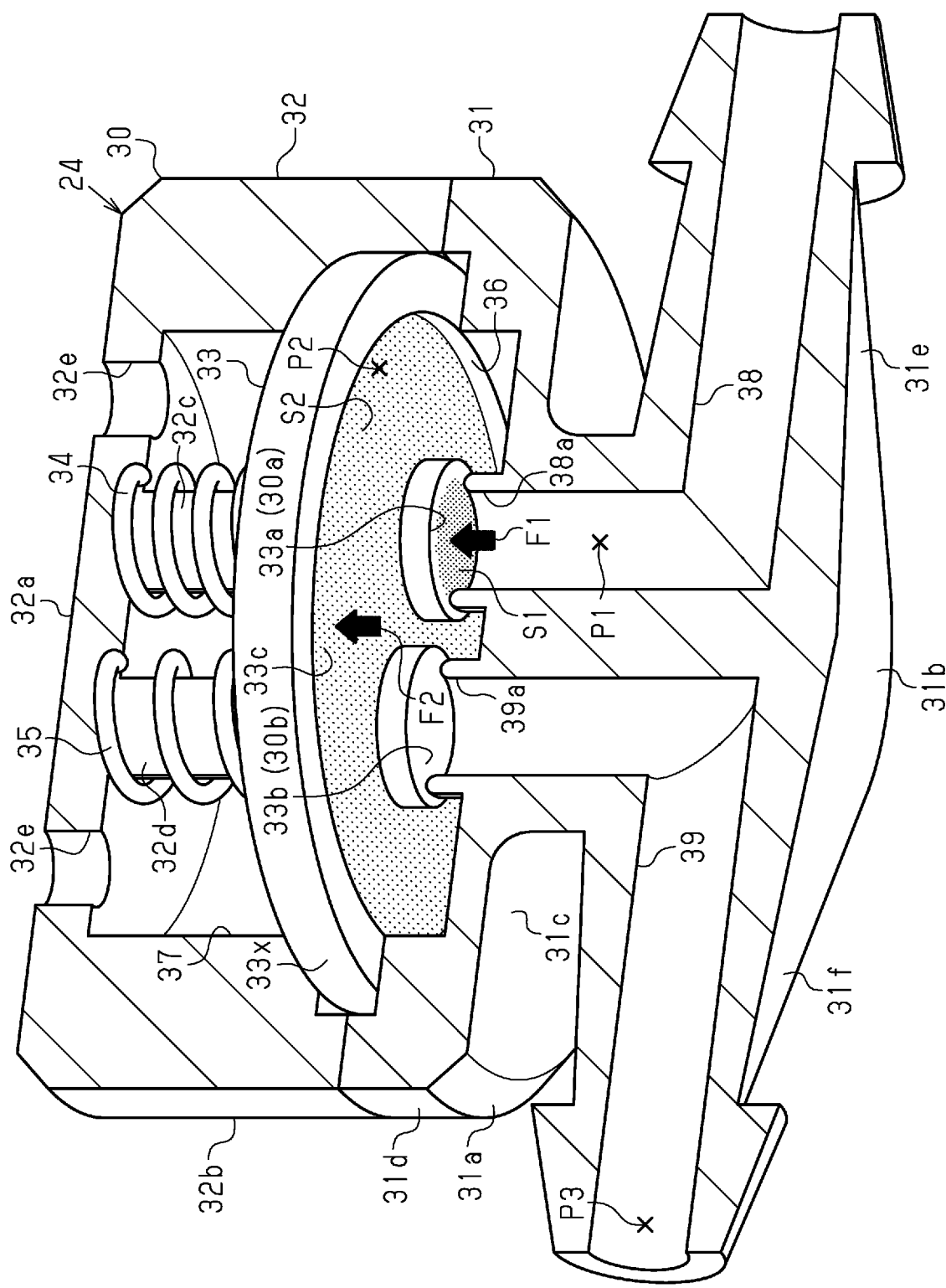
FIG. 16 is a schematic diagram of a cleaning device in accordance with the third embodiment.

As shown in FIGS. 15 and 16, the valve device 24 in accordance with the third embodiment has the same construction as the valve device 24 in accordance with the first embodiment shown in FIGS. 2 and 3. The construction of the valve device will now be described focusing on the differences from the first embodiment.

The connector 31b is arranged on the lower side of the base 31a first extending downward from the bottom wall 31c of the base 31a and then branched into two so as to have the form of letter T that is reversed upside down. One of the two branched sides of the connector 31b defines the pump connector 31e connected to the connection hose 77b located between the valve device 24 and the chamber 76 (drive pump 23). The other one of the two branched sides of the connector 31b defines the nozzle connector 31f connected to the connection hose 77c located between the valve device 24 and the ejection nozzle 25.

Movement of the valve bodies 33a and 33b allows the valve body 33a to move away from or come into contact with the open portion 38a of the intake passage 38 to open or close the passage between the chamber 76 (drive pump 23) and the valve chamber 36 and allows the valve body 33b to move away from or come into contact with the open portion 39a of the discharge passage 39 to open or close the passage between the ejection nozzle 25 and the valve chamber 36.

Figure 17:
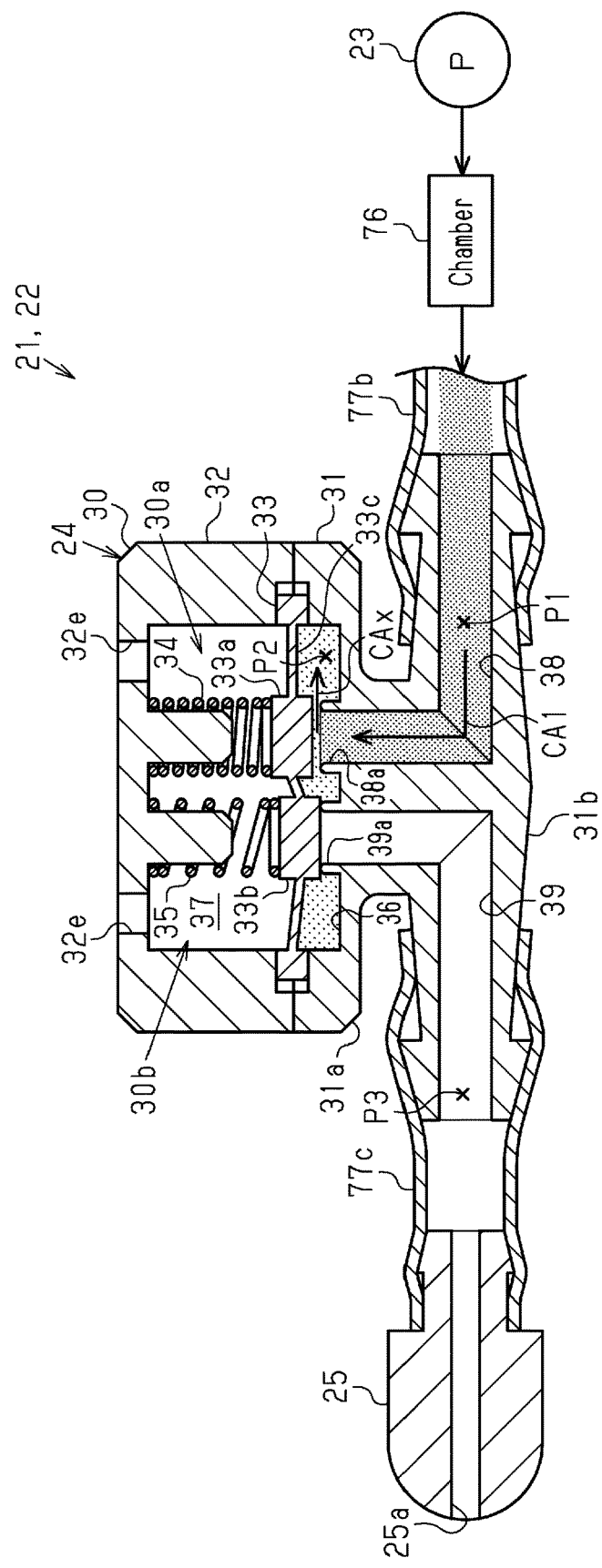
FIG. 17 is a schematic diagram illustrating the operation of the cleaning device in accordance with the third embodiment.
Figure 18:
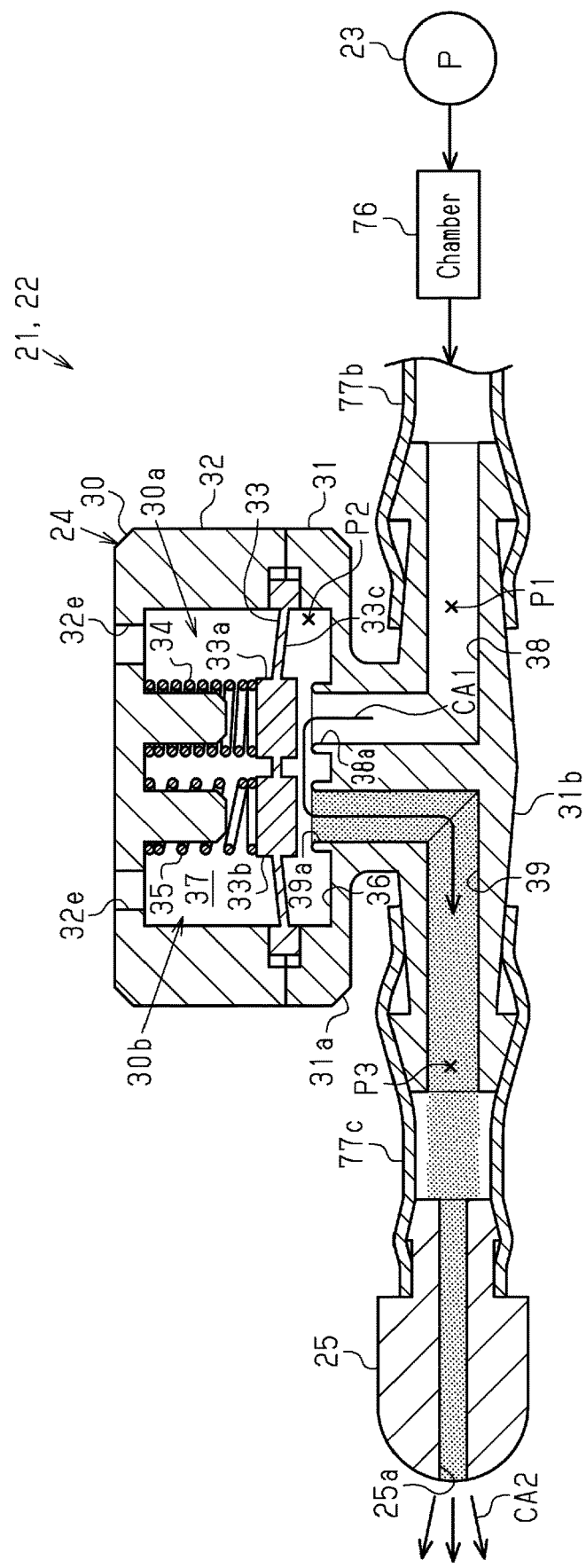
FIG. 18 is a schematic diagram illustrating the operation of the cleaning device in accordance with the third embodiment.
Figure 19:
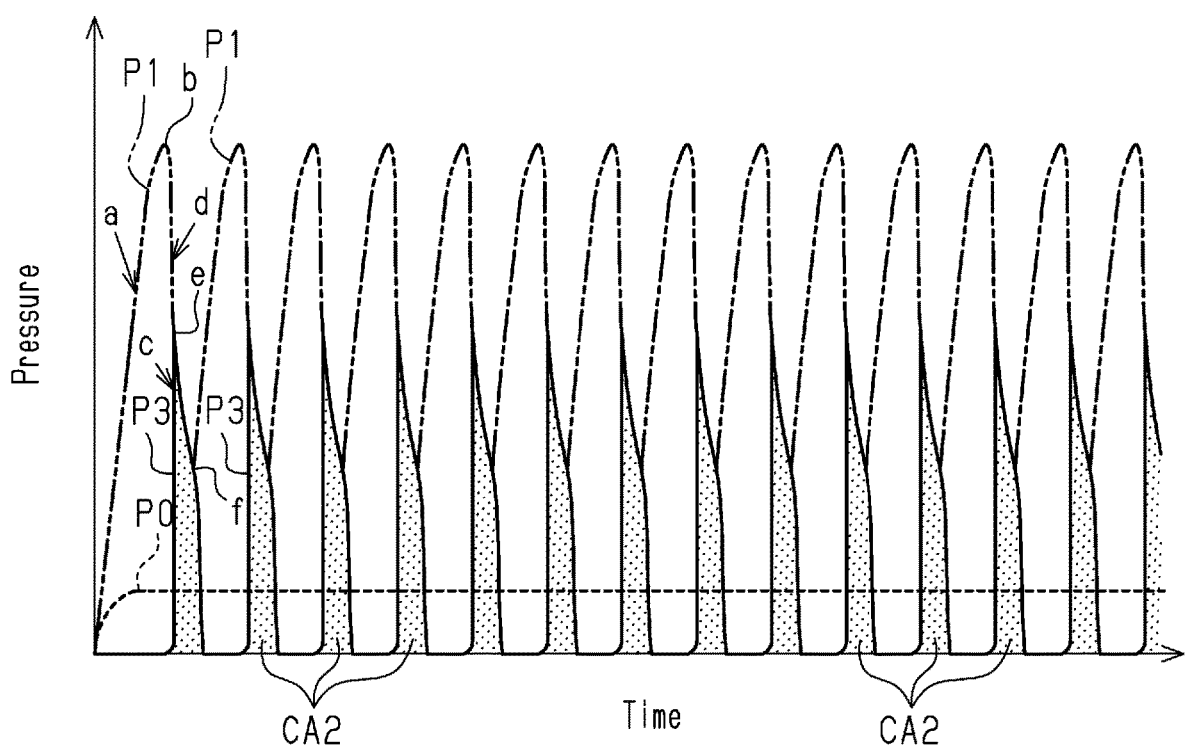
FIG. 19 is a waveform chart illustrating the operation of the cleaning device in accordance with the third embodiment.

The operation of the third embodiment will now be described. The operation of the valve device 24 shown in FIGS. 17 to 19 is similar to the operation of the valve device 24 in accordance with the first embodiment shown in FIGS. 4 to 6 and thus will not be described.

When foreign matter such as raindrops collect on the sensing surfaces 11a and 12a of the first and second distance measurement sensors 11 and 12 or whenever a predetermined time elapses regardless of whether there is foreign matter, the upper rank ECU 50 issues a cleaning instruction via the front and rear side ECUs 51 and 52 to the corresponding first and second cleaning devices 21 and 22 and drives the drive pump 23 of each of the cleaning devices 21 and 22.

As shown in FIG. 15, when the valve device 24 of each of the cleaning devices 21 and 22 is inactive, the first and second valves 30a and 30b are completely closed, that is, the valve bodies 33a and 33b of the diaphragm 33 seal the open portions 38a and 39a of the intake passage 38 and the discharge passage 39.

The drive pump 23 is driven to store air CA1 in the chamber 76, which has the predetermined volume V1, and then further supply air CA1 continuously to the chamber 76.

The air CA1 from the drive pump 23 stored in the chamber 76 is supplied to the valve device 24, which generates the output air CA2. Thus, a relatively large amount of air CA1 is stored in a compressed state in the chamber 76, which has the predetermined volume V1, so that the pressure fluctuation of the air CA1 supplied to the valve device 24 is small enough. The stabilized supply of air CA1 stabilizes the operation of the valve device 24 and allows for the generation of high-pressure, pulsed output air CA2. Each pulse of the output air CA2 will have the same high pressure. Further, when the distance between the valve device 24 and the drive pump 23 differs depending on the cleaned subject, similar output air CA2 can be generated by setting the distance between the valve device 24 and the chamber 76 equally. This increases the degree of freedom for the position where the drive pump 23 is set.

Further, the chamber 76 used in the third embodiment, which, for example, is tubular and has a closed bottom, is, for example, a chamber having a medium volume V1, an axial length L1, and a diameter L2 as shown in FIG. 14. When using the medium volume V1 chamber, the output mode of the output air CA2 will be as shown in FIG. 19. When changing the volume V1 of the chamber 76, that is, when switching between a small-volume chamber 76a shown in FIG. 20A and a large-volume chamber 76b shown in FIG. 21A, the output mode of the high-pressure, pulsed output air CA2 can be easily changed. The chamber 76a shown in FIG. 20A has a smaller volume V2, the same axial length L1, and a smaller diameter L3. The small-volume chamber 76a stores a small amount of air for pressure accumulation. However, the pressure increases to the predetermined pressure quickly. The chamber 76b shown in FIG. 21A has a larger volume V3, the same axial length L1, and a larger diameter L4. The large-volume chamber 76b stores a large amount of air for pressure accumulation. However, the pressure increases to the predetermined pressure slightly slower.

Figure 20A:
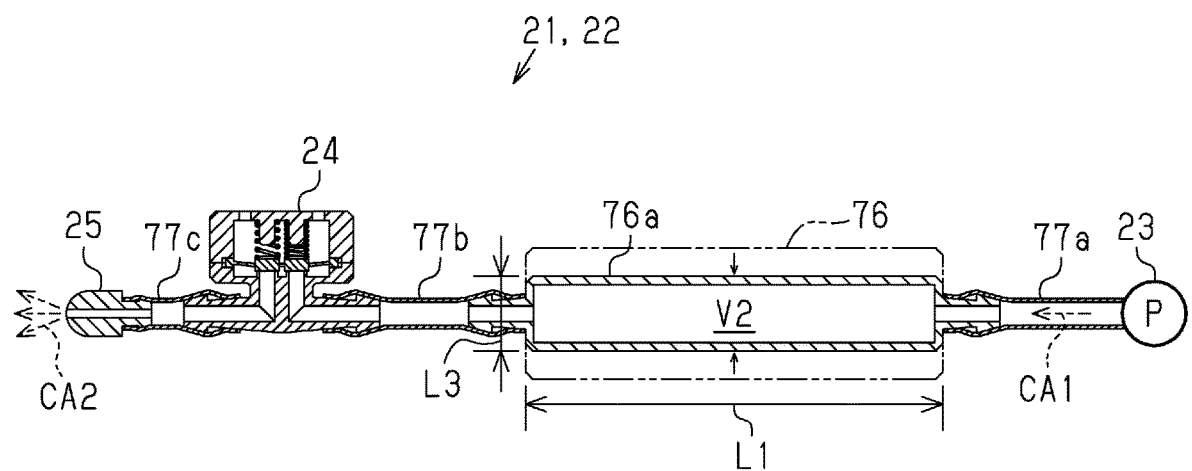
FIG. 20A is a schematic diagram of the cleaning device illustrating the changing of an output mode.
Figure 20B:
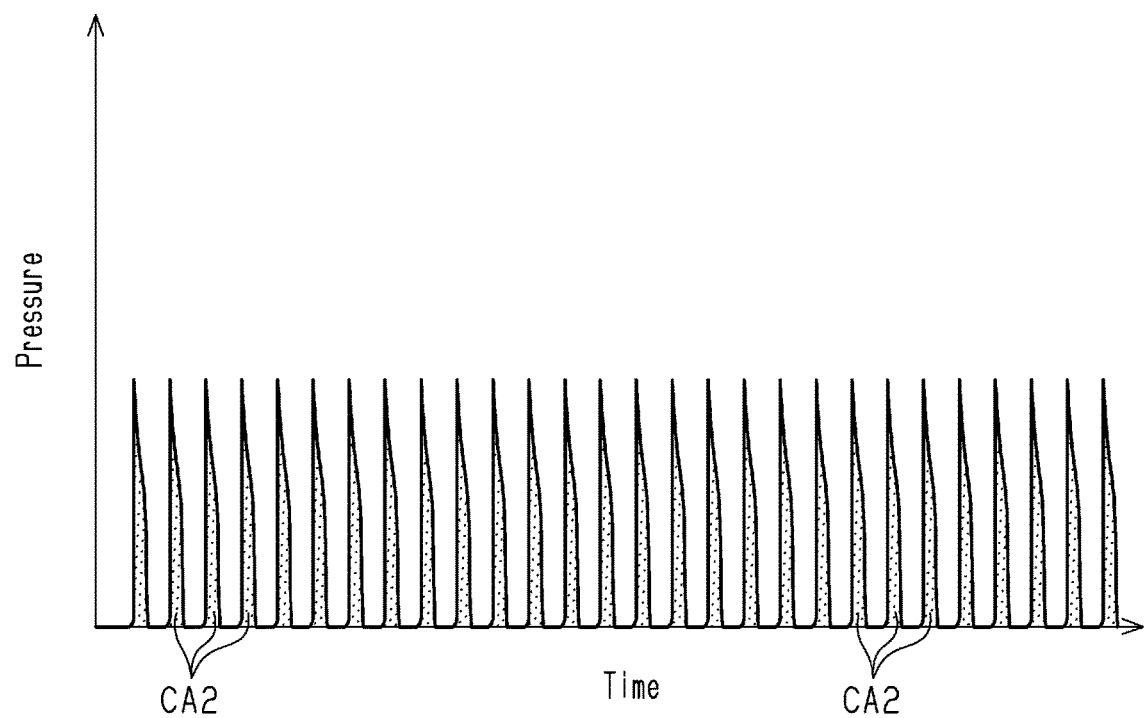
FIG. 20B is a waveform chart of when the output mode is changed.

Thus, referring to FIG. 20B, when the medium-volume chamber 76 shown in FIG. 20A is replaced by the small-volume chamber 76a, the output mode of the output air CA2 will be such that the pressure is slightly lower but the pulse interval is shorter as compared to when using the medium-volume chamber 76. Even if the pressure of the output air CA2 slightly decreases, the pressure will be high enough as compared to the discharge pressure P0 of the drive pump 23. By slightly decreasing the pressure of the output air CA2 and shortening the pulse interval, for example, foreign matter can be cleaned off quickly by frequent blasts from a cleaned subject.

Figure 21A:
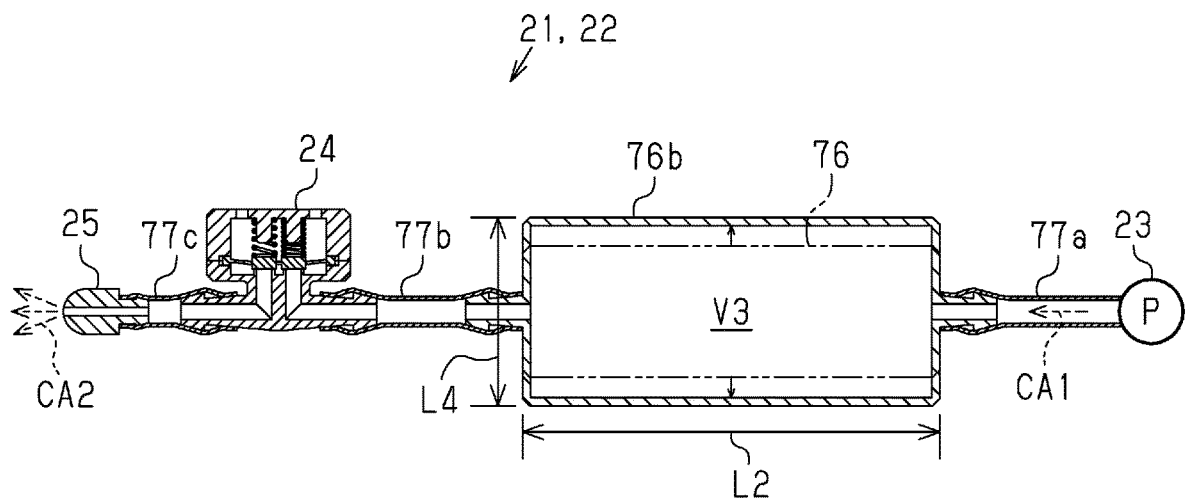
FIG. 21A is a schematic diagram of the cleaning device illustrating the changing of the output mode.
Figure 21B:
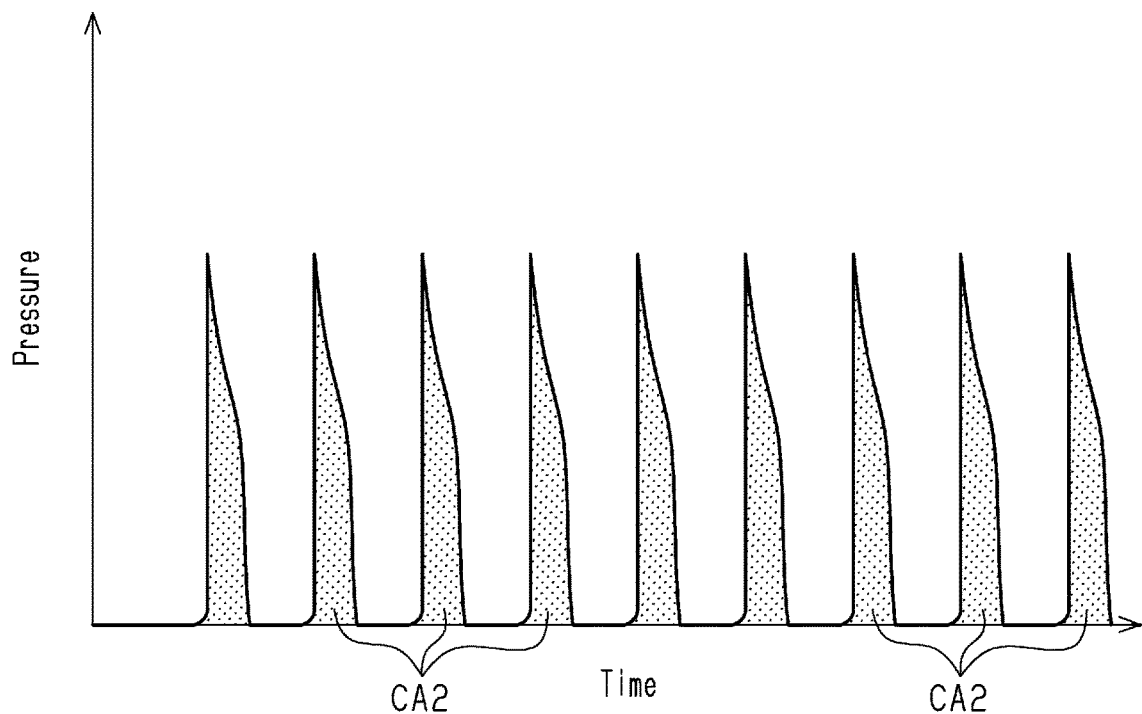
FIG. 21B is a waveform chart of when the output mode is changed.

Referring to FIG. 21B, when the medium-volume chamber 76 shown in FIG. 21A is replaced by the large-volume chamber 76b, the output mode of the output air CA2 will be such that the pressure is higher but the pulse interval is longer as compared to when using the medium-volume chamber 76. By slightly increasing the pressure of the output air CA2 and lengthening the pulse interval, for example, foreign matter can be cleaned off at once from a cleaned subject even though a certain amount of time will be needed.

Figure 13:
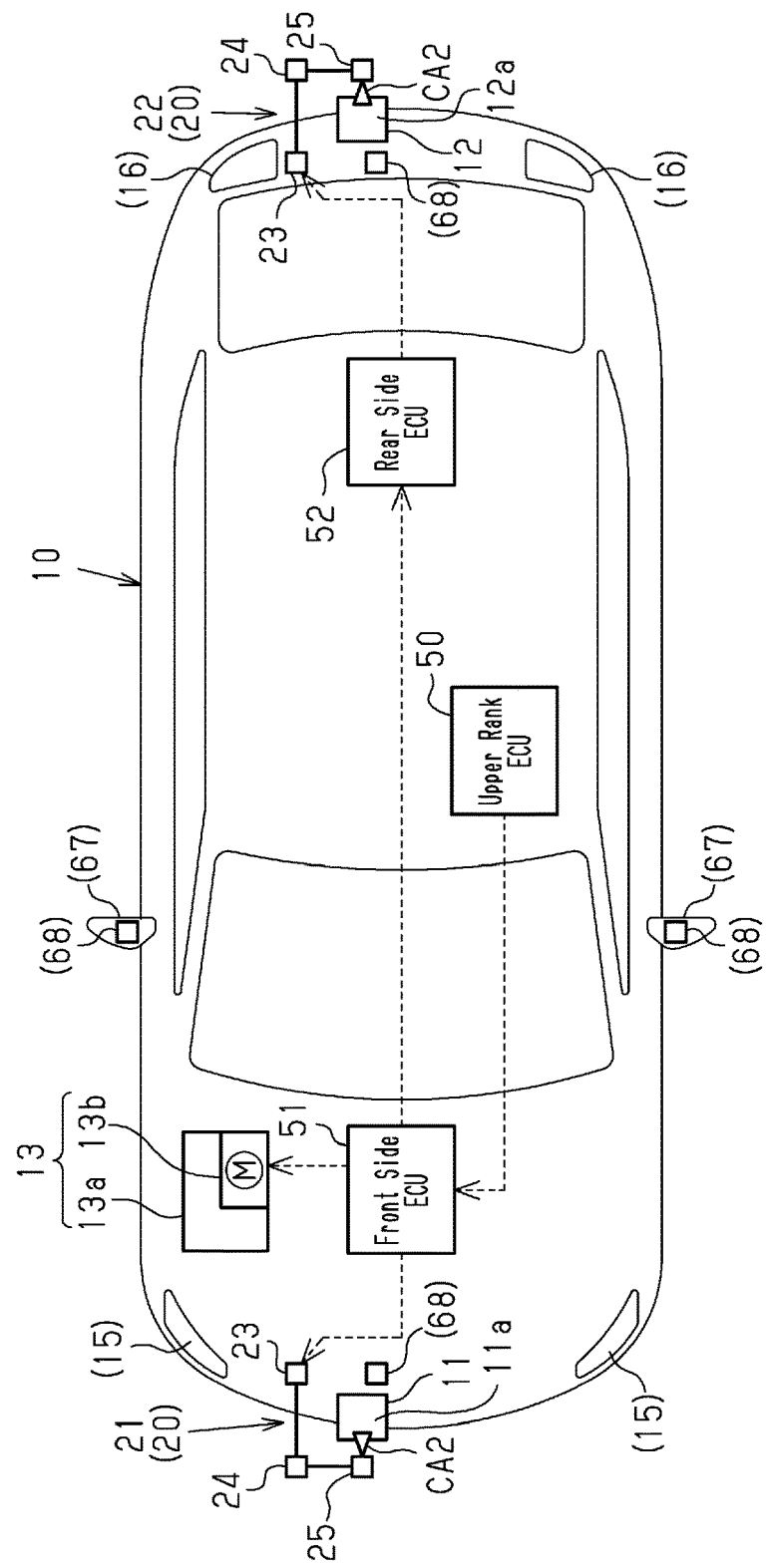
FIG. 13 is a schematic diagram of a vehicle cleaning system in accordance with a third embodiment.

As shown in FIG. 13, the front side ECU 51 may use the washer device 13, which is typically installed in the vehicle 10, in cooperation with the first and second cleaning devices 21 and 22. The washer device 13 includes the tank 13a that stores a cleaning liquid and the washer pump 13b, which is driven to supply the cleaning liquid to the windshield or the like. The output air CA2 can be sprayed after or while supplying the cleaning liquid to the sensing surfaces 11a and 12a. This improves the effect for cleaning off foreign matter that is difficult to remove just by spraying air.

The advantages of the third embodiment will now be described.

(3-1) The chamber 76 (76a, 76b) and the valve device 24 are located between the drive pump 23 and the ejection nozzle 25, and the air CA1 from the drive pump 23 is stored and pressure-accumulated in the chamber 76 and supplied to the valve device 24. The valve device 24 uses the air CA1 supplied from the drive pump 23 via the chamber 76 to accumulate pressure until the pressure becomes higher than the discharge pressure P0 of the drive pump 23 and repetitively perform a valve opening action and a valve closing action. This generates the high-pressure, pulsed output air CA2 that is sprayed against the sensing surfaces 11a and 12a of the distance measurement sensors 11 and 12. Thus, the output air CA2 that increases the cleaning capability can be generated without enlarging the drive pump 23. Further, the air CA1 from the drive pump 23 is stabilized in the chamber 76 before being supplied to the valve device 24. This generates the output air CA2 stably and increases the stability of the cleaning capability for removing foreign matter.

(3-2) The valve 30a of the valve device 24 opens the intake passage 38 of the air CA1 with the valve body 33a and accumulates pressure with the air CA1 supplied from the drive pump 23 via the chamber 76 (76a, 76b) to a pressure higher than the discharge pressure P0 of the drive pump 23. Further, the valve 30a, the valve 30b, and the like of the valve device 24 function as an auxiliary mechanism that generates leakage CAx at the leaked side (valve chamber 36 etc.) from the air CA1 in the intake passage 38. Then, the two pressures P1 and P2 accumulated in the intake passage 38 and the leaked side (valve chamber 36 etc.) open the valve body 33a and outputs the air CA1, of which the pressure has been accumulated in the intake passage 38, to the discharge passage 39. The valve body 33a is then closed to allow pressure to re-accumulate in the intake passage 38. The opening action and closing action of the valve body 33a are repeated to generate the high-pressure, pulsed output air CA2. The structure and operation of the valve device 24 allow the high-pressure, pulsed output air CA2 to be generated.

(3-3) The second valve 30b closes the discharge passage 39 and accumulates pressure in the valve chamber 36 with the leakage CAx of the air CA1 This ensures the accumulation of pressure. Thus, the valve device 24 can be stably actuated.

(3-4) The first valve body 33a and the second valve body 33b are arranged integrally on the single diaphragm 33, and the first valve 30a and the second valve 30b form the single valve device 24. This allows components to be shared, reduces the number of components and assembly steps, and facilitates handling of the valve device 24.

(3-5) The air CA1 from the drive pump 23 is stored and pressure-accumulated in the chambers 76, 76a, and 76b and stably supplied to the valve device 24. The chambers 76, 76a, and 76b having the different volumes V1, V2, and V3 are selectively set to change the output mode of the output air CA2. Thus, the chambers 76, 76a, and 76b, which have different volumes V1, V2, and V3, can be changed in accordance with the required output mode of the output air CA2. This allows for easy changing of the output mode of the output air CA2. Further, the output mode of the output air CA2 can be changed by changing the length of a connection hose directly connecting the drive pump 23 and the valve device 24 without using the chambers 76, 76a, and 76b. However, if, for example, the hose needs to be long, the use of the chambers 76, 76a, and 76b will facilitate installation in the vehicle 10.

The first to third embodiments may be modified as described below. The first to third embodiments and the following modifications can be combined as long as the combined modifications remain technically consistent with each other.

The constructions of the valve devices 24 and 24a described above are examples and may be modified.

For example, in the valve device 24 in accordance with the first and third embodiments, the second valve 30b has substantially the same valve structure as the first valve 30a. However, the second valve 30b and the first valve 30a may have different valve structures.

The single valve device 24 in accordance with the first embodiment is a single body including the first valve 30a and the second valve 30b. However, there is no limitation to such a construction. For example, two valve device 24a in accordance with the second embodiment can be connected in series between the drive pump 23 and the ejection nozzle 25. The valve device 24a located toward the drive pump 23 is used as the first valve 30a, and the valve device 24a located toward the ejection nozzle 25 is used as the second valve 30b. This forms a valve device equivalent to the valve device in accordance with the first embodiment. Thus, the valve device 24a in accordance with the second embodiment can be used in the same manner as the first embodiment to stably and intermittently supply high-pressure output air CA2 to the ejection nozzle 25.

In the valve devices 24 and 24a in accordance with the first to third embodiments, the leakage air CAx of the air CA1 is generated from between the valve body 33a and the open portion 38a to accumulate pressure in the valve chamber 36. However, the leakage air CAx can be leaked into the valve chamber 36 through a separate passage. For example, fine holes or slits may connect the intake passage 38 and the valve chamber 36. Alternatively, the surface of the open portion 38a that contacts the valve body 33a may be a roughened surface.

In the diaphragm 33 of the valve devices 24 and 24a in accordance with the first and second embodiments, the area S2 of the thin portion 33c on which the pressure P2 acts is set to be larger than the area S1 of the valve body 33a on which the pressure P1 acts (S2>S1). However, the area S1 and the area S2 may be set to be equal (S1=S2). Alternatively, the area S1 may be set to be larger than the area S2 (S1>S2). Thus, in the present embodiment and the first and second embodiments, when the valve body 33a opens, in addition to the pressure P1 acting on the portion of the area S1 including the valve body 33a, the pressure P2 may act on the portion of the area S2 around the valve body 33a so that a force for lifting the valve body 33a is generated over a larger area.

The valve devices 24 and 24a in accordance with the first and second embodiments includes the diaphragm 33 and the urging spring 34. The diaphragm 33 includes the valve body 33a that opens and closes the intake passage 38. The urging spring 34 urges the valve body 33a in a valve closing direction. When the valve body 33a opens the intake passage 38, the supply of air CA1 from the drive pump 23 pressurizes section 33a1 of the valve body 33a having area S1 (first pressurized section, refer to FIGS. 3 and 8). When air CA1 is further supplied from the drive pump 23 and the pressure P1 of the intake passage 38 increases, although the valve body 33a is closed, air CA1 leaks from the intake passage 38. This increases the pressure P2 of the valve chamber 36 at the leaked side and pressurizes section 33c1 of the thin portion 33c having area S2 around the valve body 33a (second pressurized section, refer to FIGS. 3 and 8). Thus, the air CA1 pressurizes the diaphragm 33 including the valve body 33a at the valve body 33a and the thin portion 33c around the valve body 33a. The valve body 33a cannot be opened against the urging force of the urging spring 34 by only pressurizing the section 33a1 of the valve body 33a having area S1 with the air CA1 supplied from the drive pump 23 to the intake passage 38. The valve body 33a opens the valve body 33a when the section 33c1 of the thin portion 33c having area S2, in addition to the section of the valve body 33a, is pressurized so that the pressurizing force acts on the diaphragm 33 including the valve body 33a against the urging force of the urging spring 34. From when the thin portion 33c of the diaphragm 33 is pressurized to when the valve opens, the pressure of the air CA1 in the intake passage 38 is accumulated to a pressure higher than the discharge pressure P0 of the drive pump 23. Thus, when the valve body 33a opens, the pressure-accumulated air CA1 is instantaneously output as the output air CA2 to the discharge passage 39. As the air CA1 is output to the discharge passage 39, the valve body 33a closes again. Consequently, the output air CA2, of which the pressure is increased to be higher than the discharge pressure P0 of the drive pump 23 by continuously discharging the air CA1 from the drive pump 23, is sprayed from the ejection nozzle 25 against a cleaned subject. Thus, the cleaning capability for removing foreign matter from the cleaned subject can be maintained or further increased without enlarging the drive pump 23.

In the first to third embodiment, air is sprayed as a fluid against the cleaned subject. However, a gas-liquid mixture fluid or a liquid may be sprayed. When using a liquid, it is preferred that the dispersion of the liquid from the cleaned subject be ensured.

The distance measurement sensors 11 and 12 in accordance with the first to third embodiments are respectively arranged at the middle portion of the front end of the vehicle 10 and the middle portion of the rear end of the vehicle 10 but may be arranged at the left and right sides of the vehicle 10.

In the first and second embodiments, the cleaned subject is not limited to the distance measurement sensors 11 and 12 (sensing surfaces 11*a* and 12*a*). For example, the cleaned subject may be a camera that captures images of the surrounding of the vehicle 10, sensors other than such optical sensors, and non-sensors, for example, headlights 15, taillights 16, mirrors 17, and the like that are shown in FIG. 1.

In addition to the conventional mirrors 17 that use reflections mirrors, the cleaned subjects may be digital outer mirrors 18 that are starting to replace the mirrors 17. In such a case, the output air CA2 generated by the drive pump 23 and the valve device 24 is sprayed from the ejection nozzle 25 toward image capturing surfaces of the mirrors 18.

The valve device 24 in accordance with the third embodiment is a single body including two valves, the first valve 30*a* and the second valve 30*b*, but may be formed by, for example, connecting two valve devices, each including a single valve, in series. In this case, a check valve may be used at the downstream side.

In the third embodiment, the cleaned subject is not limited to the distance measurement sensors 11 and 12 (sensing surfaces 11*a* and 12*a*). For example, the cleaned subject may be a camera that captures images of the surrounding of the vehicle 10, sensors other than such optical sensors, and non-sensors, for example, headlights 15, taillights 16, electronic side mirror cameras 67, vehicle surrounding monitoring cameras 68, and the like that are shown in FIG. 13.

The images captured by the electronic side mirror cameras 67 are often instantaneously checked when the vehicle is traveling. Thus, when the cleaning subject is the electronic side mirror cameras 67, the cleaning devices 21 and 22 may select the small-volume chamber 76*a* to output the output air CA2 that is optimal for cleaning off foreign matter quickly by frequent blasts. The images captured by the vehicle surrounding monitoring cameras 68 require a certain amount of time from when a shift lever is moved to a reverse position until an image is displayed on an on-board monitor. Further, the vehicle is in a state close to stopping. Thus, instantaneous checking is usually not necessary. Consequently, when the cleaned subject is the vehicle surrounding monitoring camera 68, the cleaning devices 21 and 22 may select the large-volume chamber 76*b* to output the output air CA2 that is optimal for cleaning off foreign matter at once from a cleaned subject even though a certain amount of time will be needed. In this manner, one of the medium-volume chamber 76, the small-volume chamber 76*a*, and the large-volume chamber 76*b* can be selected to easily change the output mode of the output air CA2 in accordance with the cleaned subject.

When changing the volumes V1, V2, and V3 of the chambers 76, 76*a*, and 76*b* that are tubular and have a closed bottom, the axial length L1 is fixed, and the diameters L2, L3, and L4 are varied. Instead, the diameter may be fixed, and axial length may be varied. Alternatively, the axial length and the diameter may both be varied. The chambers 76, 76*a*, and 76*b* do not have to be tubular and have a closed bottom and may have the form of, for example, a rectangular box, a polygonal box, or the like.

The present disclosure is illustrated through the embodiment. However, the present disclosure is not limited to the structure of the embodiment. The present disclosure includes various modified examples and modifications within the scope of equivalence. Additionally, various combinations and modes and one, more, or less of these elements in other combinations and forms are included in the range and conceptual scope of the present disclosure.

The invention claimed is:

1. A vehicle cleaning system that removes foreign matter from a subject of a vehicle, the vehicle cleaning system comprising:
a drive pump;
an ejection nozzle that sprays fluid supplied from the drive pump against the subject; and
a valve device located between the drive pump and the ejection nozzle, wherein:
the valve device includes
a housing,
an intake passage positioned in the valve device at a portion located toward the drive pump to draw in the fluid,
a discharge passage positioned in the valve device at a portion located toward the ejection nozzle,
an auxiliary mechanism, and
an urging spring that urges the valve body in a direction closing the intake passage;
the auxiliary mechanism includes a diaphragm that partitions the housing into a valve chamber through which the fluid flows and a back pressure chamber at a side opposite to the valve chamber;
the diaphragm includes a valve having a valve body configured to close the intake passage, the valve being configured to accumulate pressure so that pressure of the fluid supplied to the intake passage from the drive pump becomes higher than a discharge pressure of the drive pump;
the auxiliary mechanism is configured to
generate leakage of the fluid from the intake passage during the pressure accumulation to accumulate pressure with the leakage at a leaked side,
open the valve body based on two pressures accumulated in the intake passage and the leaked side,
output the fluid, which is pressure-accumulated in the intake passage, to the discharge passage by opening the valve body, and
close the valve body as the fluid is output to the discharge passage to allow for re-accumulation of the pressure in the intake passage;
the diaphragm includes
a first pressurized section having a first area and pressurized by the fluid supplied from the drive pump in a state in which the intake passage is closed, and
a second pressurized section located around the valve body and having a second area, the second pressurized section being pressurized at a leaked side by the fluid leaked from the intake passage in a state in which the intake passage is closed; and
the diaphragm is configured to open against an urging force of the urging spring when the first and second pressurized sections are pressurized and close when the fluid is output to the discharge passage as a result of the opening.

2. The vehicle cleaning system according to claim 1, wherein when P1 is the pressure of the fluid in the intake passage, Ps is a shut-off pressure obtained in a state in which a discharge port of the drive pump is fully closed, maximum pressure P1max is pressure of the intake passage when the valve body performs an opening action, and minimum pressure P1min is pressure of the intake passage when the valve body performs a closing action, the maximum pressure is set to be greater than ⅓ of the shut-off pressure, that is, Ps/3<P1max, and the minimum pressure is set to be less than ⅔ of the shut-off pressure, that is, P1min<2Ps/3, where P1min<P1max is satisfied.

3. The vehicle cleaning system according to claim 1, wherein when maximum pressure P1max is pressure of the intake passage when the valve body performs an opening action and minimum pressure P1min is pressure of the intake passage when the valve body performs a closing action, the minimum pressure is set to be less than 80% of the maximum pressure, that is, P1min<0.8P1max.

4. The vehicle cleaning system according to claim 1, wherein the drive pump is an air pump that supplies air as the fluid.

5. The vehicle cleaning system according to claim 1, further comprising:

a chamber located between the drive pump and the valve device, wherein the chamber is arranged to store the fluid from the drive pump and supply the fluid to the valve device.

6. A vehicle cleaning system that removes foreign matter from a subject of a vehicle, the vehicle cleaning system comprising:

a drive pump;

an ejection nozzle that sprays fluid supplied from the drive pump against the subject; and a valve device located between the drive pump and the ejection nozzle, wherein:

the valve device includes a housing, an intake passage positioned in the valve device at a portion located toward the drive pump to draw in the fluid, a discharge passage positioned in the valve device at a portion located toward the ejection nozzle, and an auxiliary mechanism;

the auxiliary mechanism includes a diaphragm that partitions the housing into a valve chamber through which the fluid flows and a back pressure chamber at a side opposite to the valve chamber;

the diaphragm includes a valve having a valve body configured to close the intake passage, the valve being configured to accumulate pressure so that pressure of the fluid supplied to the intake passage from the drive pump becomes higher than a discharge pressure of the drive pump; and the auxiliary mechanism is configured to generate leakage of the fluid from the intake passage during the pressure accumulation to accumulate pressure with the leakage at a leaked side, open the valve body based on two pressures accumulated in the intake passage and the leaked side, output the fluid, which is pressure-accumulated in the intake passage, to the discharge passage by opening the valve body, and close the valve body as the fluid is output to the discharge passage to allow for re-accumulation of the pressure in the intake passage.

7. The vehicle cleaning system according to claim 6, wherein the diaphragm is arranged in the housing and arranged integrally with the valve body, and the housing includes a communication hole that connects the back pressure chamber to the outside and exposes the back pressure chamber to atmosphere.

8. The vehicle cleaning system according to claim 6, wherein the diaphragm is arranged integrally with the valve body, the valve device includes an urging spring that urges the diaphragm, and the housing accommodates only the diaphragm and the urging spring.

9. The vehicle cleaning system according to claim 6, wherein when P1 is the pressure of the fluid in the intake passage, Ps is a shut-off pressure obtained in a state in which a discharge port of the drive pump is fully closed, maximum pressure P1max is pressure of the intake passage when the valve body performs an opening action, and minimum pressure P1min is pressure of the intake passage when the valve body performs a closing action, the maximum pressure is set to be greater than ⅓ of the shut-off pressure, that is, Ps/3<P1max, and the minimum pressure is set to be less than ⅔ of the shut-off pressure, that is, P1min<2Ps/3, where P1min<P1max is satisfied.

10. The vehicle cleaning system according to claim 1, wherein when maximum pressure P1max is pressure of the intake passage when the valve body performs an opening action and minimum pressure P1min is pressure of the intake passage when the valve body performs a closing action, the minimum pressure is set to be less than 80% of the maximum pressure, that is, P1min<0.8P1max.

11. The vehicle cleaning system according to claim 6, wherein the drive pump is an air pump that supplies air as the fluid.

12. The vehicle cleaning system according to claim 6, wherein the ejection nozzle is configured to function as a restriction and accumulate the pressure of the fluid leaked from the intake passage at a downstream side of the valve of the valve device so that the accumulated pressure at the leaked side acts to open the valve body.

13. The vehicle cleaning system according to claim 12, wherein the valve body is arranged integrally with the diaphragm, and an area of the diaphragm on which the pressure accumulated at the leaked side acts is larger than an area of the valve body on which the pressure accumulated in the intake passage acts.

14. The vehicle cleaning system according to claim 6, further comprising:

a chamber located between the drive pump and the valve device, wherein the chamber is arranged to store the fluid from the drive pump and supply the fluid to the valve device.

15. The vehicle cleaning system according to claim 14, wherein the chamber is one of multiple chambers configured to change an output mode of the fluid.

16. The vehicle cleaning system according to claim 6, wherein the valve having the valve body defines a first valve that includes a first valve body, the auxiliary mechanism of the valve device further includes a second valve that includes a second valve body, and the second valve is configured to close the discharge passage with the second valve body and accumulate pressure of the fluid leaked from the intake passage so that the accumulated pressure at the leaked side acts to open the first and second valve bodies.

17. The vehicle cleaning system according to claim 16, wherein the first and second valves form the valve device as a single unit, and the first and second valve bodies are arranged integrally on a the single diaphragm.

18. The vehicle cleaning system according to claim 17, wherein an area of the diaphragm on which the pressure accumulated at the leaked side acts is larger than an area of the first valve body on which the pressure accumulated in the intake passage acts.

* * * * *